(12) United States Patent
De Maeyer

(10) Patent No.: US 7,337,895 B2
(45) Date of Patent: Mar. 4, 2008

(54) MOBILE GASTRONOMIC TABLE FOR SERVING OUT FOOD

(76) Inventor: Marc De Maeyer, Hoog Kallo 13, Beveren (BE) B-9120

( * ) Notice: Subject to any disclaimer, the term of this patent is extended or adjusted under 35 U.S.C. 154(b) by 159 days.

(21) Appl. No.: 10/552,600

(22) PCT Filed: Apr. 7, 2004

(86) PCT No.: PCT/EP2004/003775
§ 371 (c)(1), (2), (4) Date: Oct. 7, 2005

(87) PCT Pub. No.: WO2004/089167
PCT Pub. Date: Oct. 21, 2004

(65) Prior Publication Data
US 2006/0283686 A1    Dec. 21, 2006

(30) Foreign Application Priority Data
Apr. 8, 2003    (EP) ................... 03447084

(51) Int. Cl.
*B65G 21/08*    (2006.01)
(52) U.S. Cl. .................... 198/860.2; 198/583
(58) Field of Classification Search ............... 198/583, 198/860.2, 833, 861.5, 495, 497
See application file for complete search history.

(56) References Cited

U.S. PATENT DOCUMENTS

| | | | |
|---|---|---|---|
| 1,648,531 A | 11/1927 | Bayley | |
| 3,353,652 A * | 11/1967 | Fellner, Jr. | 198/463.3 |
| 3,874,479 A | 4/1975 | Onori et al. | |
| 4,765,440 A | 8/1988 | Tashman | |
| 5,096,045 A * | 3/1992 | Feldl | 198/583 |
| 5,117,967 A * | 6/1992 | Morrow et al. | 198/495 |
| 5,568,857 A | 10/1996 | Chen et al. | |
| 5,609,238 A * | 3/1997 | Christensen | 198/860.2 |
| 6,409,011 B1 | 6/2002 | Ferguson | |

OTHER PUBLICATIONS

International Search Report (PCT/EP2004/003775) (Aug. 17, 2004).
Written Opinion (PCT/EP2004/003775) (Aug. 17, 2004).

* cited by examiner

*Primary Examiner*—James R. Bidwell
(74) *Attorney, Agent, or Firm*—Clark & Elbing LLP

(57) ABSTRACT

A movable table for serving out food has an operating position for serving out food, and a transportation position for moving of the table. The movable table comprises at least two modules, each module comprising an automated transferring device, e.g. at least one conveyor belt, for transferring food receptacles from one end of the table to an opposite end thereof. The upper side of the transferring device in operating position forms a working surface of the table. The table is furthermore adapted for fixing a support above the table surface. Each module may be provided with a transferring mechanism for transferring food receptacles on the automated transferring device of that module when the table is in the operating position. The transferring mechanism of a module operatively connects as the table is into the operating position and operatively disengages when the table is brought into the transportation position.

14 Claims, 16 Drawing Sheets

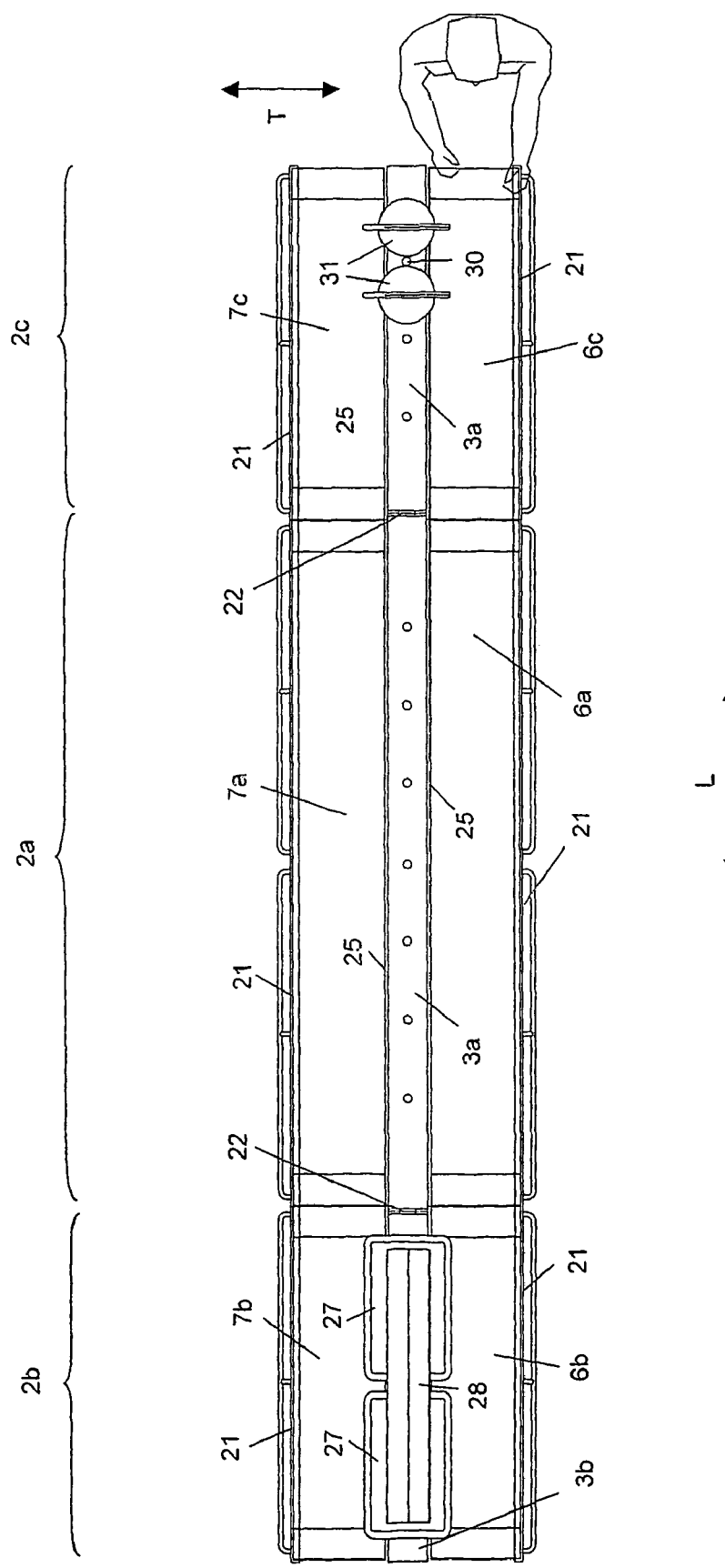

MOBILE GASTRONOMIC TABLE FOR SERVING OUT FOOD

CROSS-REFERENCE TO RELATED APPLICATIONS

This application is the U.S. National Stage of International Application No. PCT/EP2004/003775, filed Apr. 7, 2004, which, in turn, claims the benefit of EP Application No. 03447084.9 filed Apr. 8, 2003.

TECHNICAL FIELD OF THE INVENTION

The present invention relates to a mobile table for serving out food and a method of operating the same.

BACKGROUND OF THE INVENTION

A table for serving out food is a table that is used for systematically arranging or garnishing food on plates or dishes.

It is known that such tables for serving out food are often used in the field of catering, for example in big restaurants where in a short period of time a large number of plates need to be served out substantially equally. Tables for serving out food mainly consist of large tables, alongside which a plurality of persons can position themselves, generally standing, and across which plates or dishes are systematically moved by hand from one end to the other. Each person standing alongside the table carries out one of the required or desired acts of serving out food and pushes the plate or dish towards a next person.

Usually these tables are made as long as possible, in order to be able to fill a lot of plates or dishes in a short time period. However, the use of these tables is almost only necessary at the moment when the plates or dishes need to be served. At other times, such large tables may be seen as cumbersome because they take up space in the kitchen when they are not needed.

Furthermore, in the field of mobile events and catering, often no tables suitable for serving out food are present, or if any are present, they often are too small.

A portable or movable table for serving out food is known from Pavoni Italia under the trademark Spiattina®. It comprises a motor block onto which two pivotable arms are connected, each arm comprising a conveyor belt for transporting plates from one end of the table to another end thereof. In transport position, both arms are folded upwardly. In order to place the portable table in an operating position, the motor block is placed onto another, existing table, and both arms are brought in a substantially horizontal position. Each arm is provided with supporting legs which are placed onto the other table and which support the arms with the conveyor belts.

It is a disadvantage of the Spiattina® device that always another table having the right dimensions for supporting the motor block and the supporting legs needs to be present. Furthermore, when using the Spiattina® device, food to be put onto the plates needs to be stored on the table underneath the Spiattina® device, or one must hold it in his/her hand. This is not a very convenient way of working. Bending down to retrieve the food is not ergonomic and can result in back pain or tiredness.

Furthermore, in kitchens, and certainly in catering which is often carried out in places whit less stringent hygienic rules, a problem of food poisoning from contaminated food exists and is serious: many persons get ill and thousands die each year from this cause. Food poisoning is due to pathogens, e.g. bacteria, which are delivered in hotels and restaurants on consumer's plates. Some of these pathogens are dangerous: for example the bacteria *Escherichia coli* strain 0157 is potentially untreatable and may lead to renal failure, brain damage and death. Transfer of these bacteria often takes place by cross-contamination from contaminated meat to uncooked vegetables. It is therefore very important to keep kitchens and kitchen material as clean as possible and to disinfect kitchen material on a regular basis.

SUMMARY OF THE INVENTION

It is an object of the present invention to provide a table for serving out food that is suitable for being used in catering, i.e. that is suitable for being moved from one place to another and that is convenient to work with.

It is a further object of the present invention to provide a table for serving out that can easily be adapted to the needs of the persons serving out, and to the available space, i.e. to provide a table for serving out, the dimensions of which can easily be changed.

It is a further object of the present invention to provide a movable or portable table for serving out food that is easy to clean and disinfect.

The above objectives are accomplished by a table for serving out food according to the present invention.

The present invention provides a movable table for serving out food, comprising at least two modules. The table has an operating position for serving out food, and a transportation position for transporting the table. The at least two modules comprise an automated transferring device for transferring food receptacles from one end of the table to an opposite end thereof, the upper side of the transferring device in operating position forming a working surface of the table. Each of the at least two modules are provided with a transferring mechanism for transferring food receptacles on the automated transferring device of that module when the table is in the operating position. The transferring mechanism of a module is operatively connectable to the transferring mechanism of a neighbouring module as the table is brought into operating position and operatively disengaged when the table is brought into the transportation position.

The table may furthermore comprise a device for bringing the transferring mechanism of a module into operating condition with the transferring mechanism of a neighbouring module. This device may be an automatic coupling device or a manually operated coupling device.

If the operative connection is made automatically, i.e. the device for bringing the transferring mechanism of a module into operating condition with the transferring mechanism of a neighbouring module is an automatic coupling device, then the operative connection is made as soon as the table is brought in operating position. Due to the automatic engaging and disengaging of the different modules in operation respectively storing or transportation condition, no specific skilled or trained persons are needed to set the table up or to prepare it for transport or storing. This can be done by conventional kitchen personnel.

If the operative connection between the transferring mechanisms of two neighbouring modules is not made automatically, and the device for bringing the transferring mechanism of one module in co-operation or in operation condition with the transferring device of a neighbouring module is a manually operated coupling device, then a further action or series of actions are required. Examples of such manually operated coupling devices are e.g. a gear box for bringing a cog into registration with a gear or a clutch, or a lever to bring a shaft into contact with a friction drive. The manually operable device can be combined with a locking device. Such locking device is useful so that during operation it is not possible to accidentally lift one module. Also, the transferring mechanism should, according to a preferred embodiment, only work when the modules are locked in place, otherwise they may be misaligned and damage something if the transferring mechanism starts up. None of these further actions require any machine-technical skills, and thus they can be performed by conventional kitchen personnel.

According to the present invention, the transferring mechanism may be driven by a motor, or it may be driven by the driving force of another transferring mechanism.

The transferring mechanism thus may, but does not need to, involve a motor, and if it does not involve a motor, it only involves something which allows the transferring device to operate. The table may comprise a single motor unit for all modules. As a motor unit is heavy, having a single motor unit for the complete table makes the table lighter, and thus easier to handle during transport.

The table may furthermore be provided with means for fixing a support above the table surface. The means for fixing a support may be made integral with the table. The means for fixing a support may be telescopic with respect to the working surface of the table. Provision of such means for fixing a support above the table surface allows for easy serving out of food, without back pain or tiredness.

The modules may be foldable with respect to each other. When the modules are folded with respect to each other, the table becomes easier to handle during transport, and is easier to put aside in order not to occupy excessive space e.g. in the kitchen.

A module can be disconnected if not needed.

The transferring device may comprise at least one conveyor belt. The transferring device may comprise two conveyor belts adjacent each other.

A table according to the present invention may furthermore comprise a set of collapsible legs for positioning the table. These legs may be, but do not need to be, provided with wheels for easier transport.

A movable table according to the present invention may furthermore comprise cleaning means for cleaning the working surface of the table. The cleaning means may comprise a mechanical surface cleaning means such as a scrapping device for scraping food from the working surface. The table may comprise disinfecting means for disinfecting the working surface. The disinfecting means may comprise a UV radiation unit. Alternatively, the disinfecting means may comprise a disinfectant spraying unit.

The table may furthermore comprise a heating unit and/or a cooling unit for heating and/or cooling at least part of the working surface.

The present invention also provides a movable table for serving out food, comprising at least two modules, the table having an operating position for serving out food, and a transportation position for moving of the table. Each of the at least two modules comprise an automated transferring device for transferring food receptacles from one end of the table to an opposite end thereof, the upper side of the transferring device in operating position forming a working surface of the table. The table is furthermore provided with means for fixing a support above the table surface.

These and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

FIG. 2 is a top view of an embodiment of a table as in FIG. 1, comprising a small central unit onto which a support for one dish can be fixed.

Figure 1:
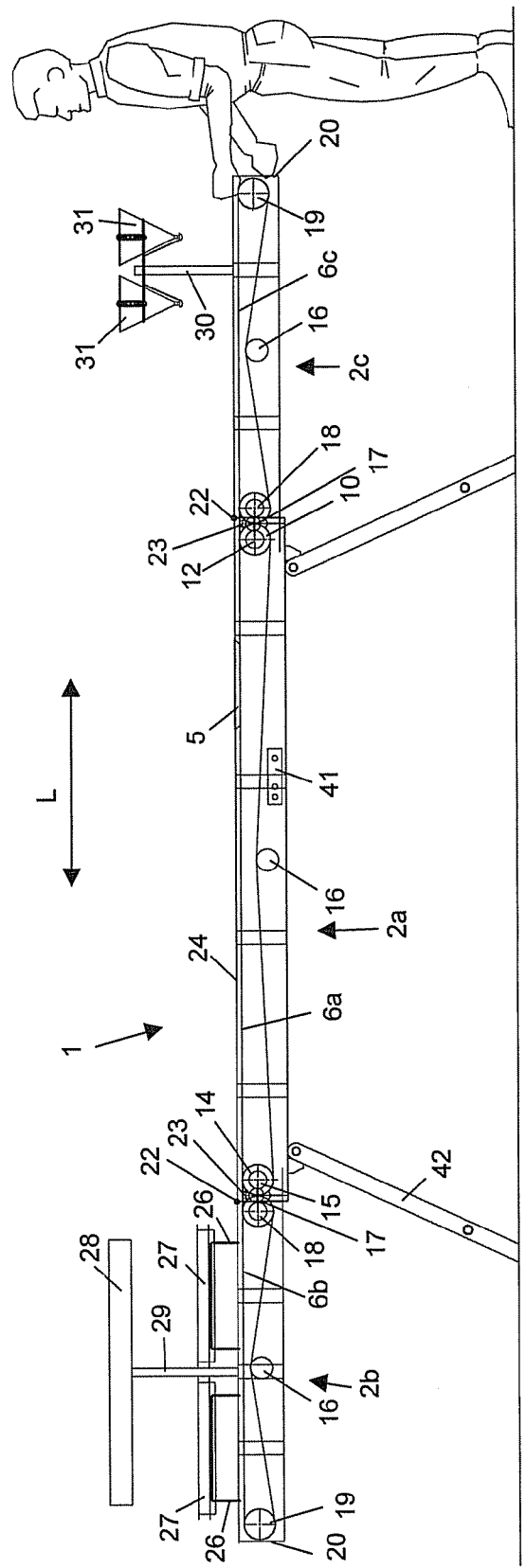
FIG. 1 is a front view of a first embodiment of a movable table for serving out food according to the present invention, which is made partially transparent, the table comprising three modules.

In the different drawings, the same reference figures refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

FIG. 1 shows a front view of a first embodiment of a portable or movable table 1 for serving out food according to the present invention. This table 1, in the embodiment shown, comprises three modules: a central module 2a and two end modules 2b and 2c, which in operating condition are connected to each other. The present invention is not limited to three modules but may include less, e.g. two, or more e.g. four or more.

At least the central module 2a of a movable table 1 for serving out food according to the first embodiment of the present invention comprises a central unit 3a, as shown in FIG. 2, which is a top view of a first embodiment of a table as shown in FIG. 1. Also end modules 2b, 2c may, but do not need to comprise such central unit 3b, 3c. The central unit 3a, 3b, 3c is a hollow tube with a substantially rectangular cross-section, which may be formed, for example, by welding together, preferably by continuous welding or by spot-welding, by screwing or by gluing two profiles with a substantial U-shape. The central unit 3a, 3b, 3c extends substantially over the length of the respective module 2a, 2b, 2c. The central unit 3a, 3b, 3c is substantially closed from the environment. The central unit 3a of the central module 2a may have a height which is different from, e.g. higher than, the height of the central units 3b, 3c of the end modules 2b, 2c.

All modules 2a, 2b, 2c comprise a working surface. The working surface of a module 2a, 2b, 2c has a transferring surface for transferring plates 5 from one end of the table 1 to an opposite end of the table 1, in a longitudinal direction L (in either of the senses). It is to be understood that with "plates" 5 is meant any kind of food receptacles, such as plates, bowls, cups, dishes and others. The transferring surface comprises automated devices for transferring the plates 5, e.g. a robot or similar. For example, in the example shown in the drawings the transferring surface comprises two conveyor belts 6a, 7a; 6b, 7b; 6c, 7c for each module 2a, 2b, 2c for conveying plates 5 in longitudinal direction L of the table, the conveyor belts 6a, 7a, 6b, 7b, 6c, 7c being placed adjacent each other in transverse direction T, each along one side of the respective central unit 3a, 3b, 3c if such central unit is present. Alternatively only one conveyor belt per module 2a, 2b, 2c can be provided as well. The front view of FIG. 1 is made partially transparent, so as to show the position of the individual transferring devices 6a, 6b, 6c in the modules 2a, 2b, 2c in the table 1.

Alternatively, instead of moving plates 5 by means of the transferring surface, food or meals can be directly prepared on the transferring devices 6a, 6b, 6c, 7a, 7b, 7c, or it can be prepared directly on one of the transferring devices, for example on transferring device 6b, and then put on a plate 5 on the next transferring device 6a.

The working surface of an end module 2b, 2c may furthermore comprise a waiting area (not represented in the drawings), which is an area at which plates 5 are no longer transferred. A waiting area may be provided at both end modules 2b, 2c, at the extremities located away from the central module 2a, or only at one end module. If a first and a second waiting area are provided, respectively before and after the transferring surfaces formed e.g. by conveyor belts 6b, 6c, 7b, 7c, seen in the direction of movement of the plates 5, then on the first waiting area, for example, empty plates may be gathered, ready for being served out. A first person at the serving out table 1 takes an empty plate from a stack on the first waiting area, and starts the process of serving out food. At the second waiting area, completed plates are gathered, ready for being taken away by waiters and waitresses for being served to the customers.

The conveyor belts 6a, 6b, 6c, 7a, 7b, 7c may be made from any material which is suitable for use in a kitchen and which is easy to clean, such as for example a belt of which at least the outer surface consists of stainless steel, of which the extremities are connected, for example welded together by laser-welding, so as to form an endless belt. In a practical embodiment, the conveyor belts 6a, 6b, 6c, 7a, 7b, 7c may consist of a thin sheet of stainless steel, for example having a thickness of about 0.3 mm. By using conveyor belts 6a, 6b, 6c, 7a, 7b, 7c of stainless steel, the table 1 has the advantage that the working surfaces are very suitable for being used in kitchens, for the use of stainless steel is hygienic. A surface of stainless steel can easily be cleaned. The working surfaces have a limited height, for example are about 16 cm high.

The transferring surface of a module 2a, 2b, 2c as illustrated in FIG. 1 and FIG. 2 comprises at least one conveyor belt 6a, 7a, 6b, 7b, 6c, 7c. The at least one conveyor belt 6a, 7a of one of the modules, preferably, and as shown in FIG. 1 and FIG. 2, of the central module 2a, has a drive motor 9 and the at least one conveyor belt 6a, 7a and its drive motor 9 are preferably located in a position approximately at the same height to form a slab-shaped table 1 rather than box-shaped. The drive motor 9 is preferably located in a position so that the thickness of the table 1 in the vertical direction is kept small, for example 20 cm or smaller.

Figure 3A:
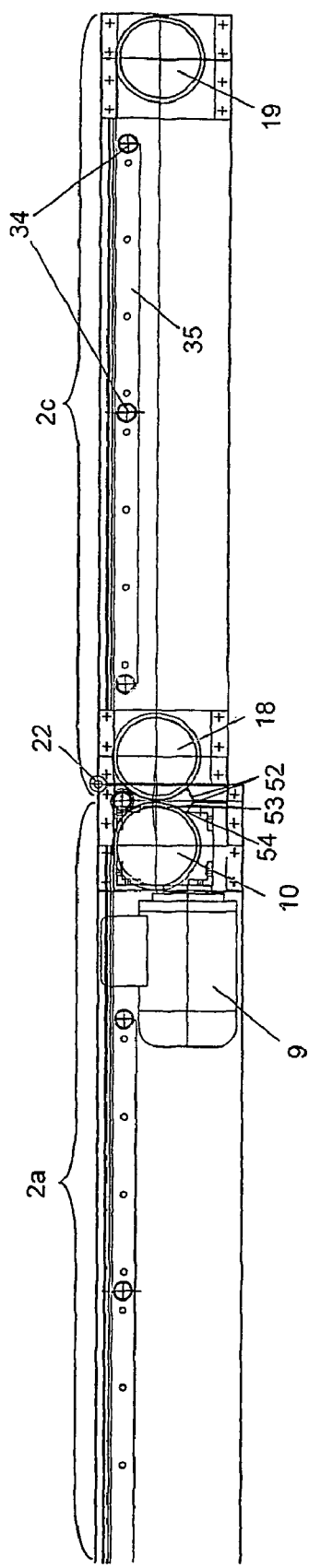
FIG. 3A is a cross-sectional front view and FIG. 3B is a cross-sectional top view of part of a table according to an embodiment of the present invention, which part contains the drive motor for a conveyor belt. In these drawings, the conveyor belt is not represented.
Figure 3B:
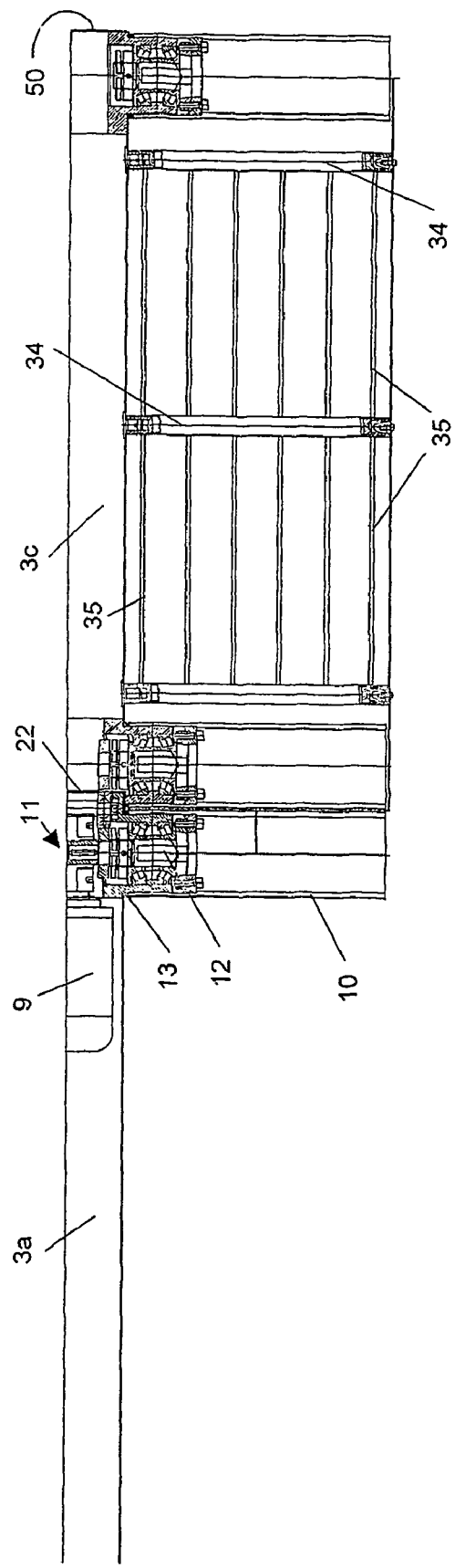

Movement of the at least one conveyor belt 6a, 7a of one module, in the example illustrated in FIG. 1 and FIG. 2 of the central module 2a, is driven by the drive motor 9 provided in the central unit 3a, as illustrated in FIG. 3A, and FIG. 3B, which drive motor 9 is coupled to a drive roll 10 of the conveyor belt 6a, 7a by means of a gear box 11. A worm drive may be used for example, which drives an axis 12 for rotation. However, any other speed-transforming transmission may be used which reduces the rotational frequency of the drive motor 9 and transforms this rotation into a rotation of an axis 12. Over the axis 12 is provided the first cylinder 10, which drives the belt 6a, 7a. It is possible to have this first cylinder 10 made of rubber or any other material which provides friction between the cylinder 10 and the belt 6a, 7a. Preferably, the cylinder 10 is made from stainless steel and provided with O-rings (not represented in the drawings). Three or four O-rings are sufficient for providing enough friction between the first cylinder 10 and the conveyor belt 6a, 7a, so as to be able to drive the conveyor belt 6a, 7a. This embodiment is very hygienic and easy to clean: the O-rings can be taken off and can be washed, e.g. in a dishwasher. Also the first cylinder 10 can be cleaned. Furthermore, a seal 13, such as a V-seal or a quadring, is provided between the first cylinder 10 and the central unit 3a.

At the other end of the belt 6a, 7a, a similar cylinder 14 (FIG. 1) is provided on an shaft or axle 15 around which it can turn. One or more supporting cylinders 16 may be, but do not need to be, provided for supporting the conveyor belt 6a, 7a. According to a preferred embodiment, these supporting cylinders 16 may be used for supporting the conveyor belt 6a, 7a when bringing the table 1 into non-operation condition, as explained below.

The drive of the at least one conveyor belt 6a, 7a may be continuous or intermittent.

Figure 4:
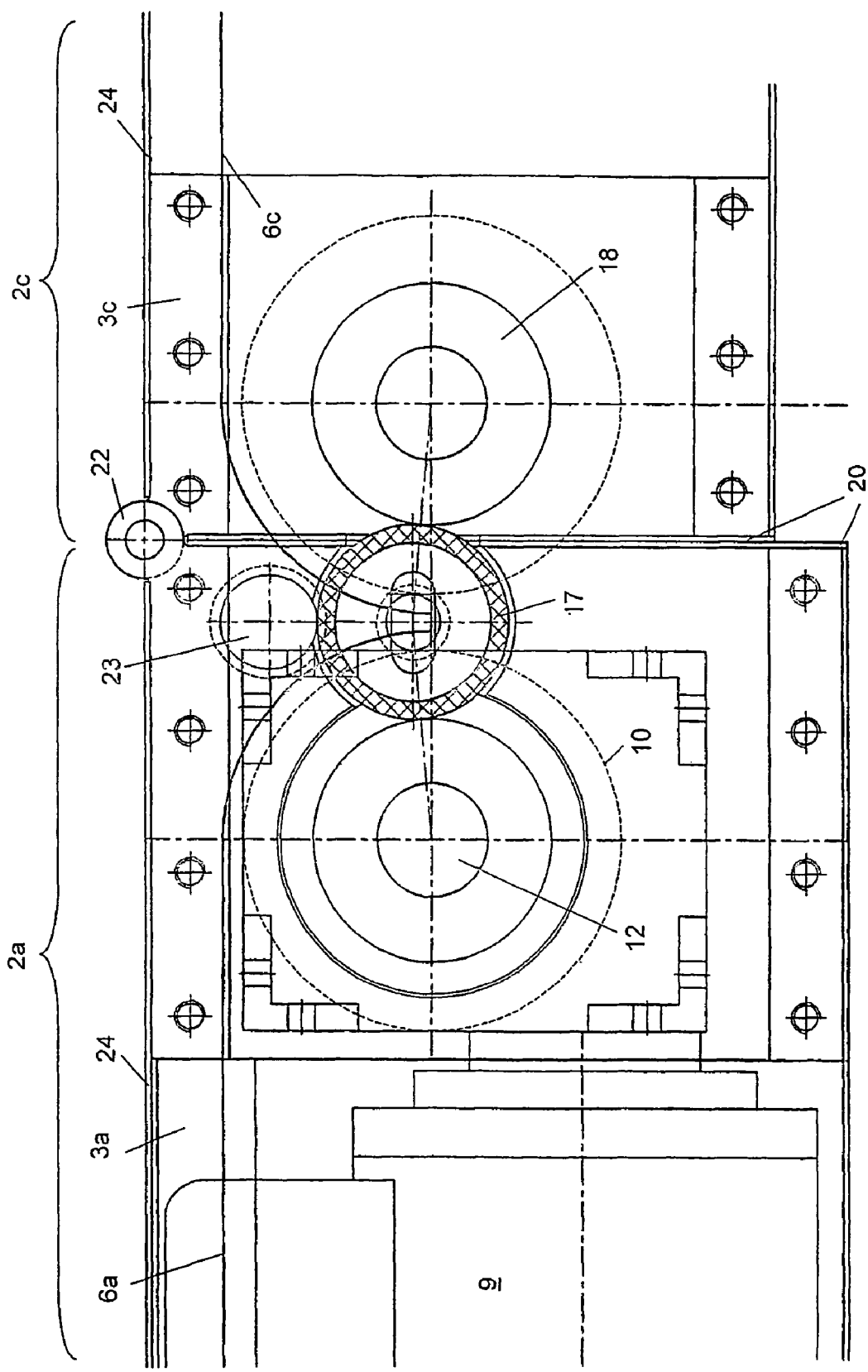
FIG. 4 illustrates the synchronous coupling between axes of drive rolls of two conveyor belts of different modules by means of a friction gear according to an embodiment of the present invention.

The conveyor belt 6b, 6c of an end module 2b, 2c connected to the central module 2a is operatively connectable. This means it is driven by means of a coupling, preferably a flexible coupling which automatically locates itself to be operatively linked with the drive of the central module when the end modules 6b, 6c are brought into the operation position. The flexible coupling may for example comprise a spinloaded dog-clutch, e.g. a friction wheel 17 or a gear for example, as shown in detail in FIG. 4. Therefor, the conveyor belt 6b, 6c is also provided around two parallel cylinders or rolls 18, 19. One of those rolls 18 is driven by one of the rolls 10, 14 of the central module 2a, by means of the flexible coupling, for example by means of a friction wheel 17. The other roll 19 in the end module 2b, 2c is a free running roll.

The modules connected to the central module 2a may either be end modules 2b, 2c as described above, and as illustrated in the drawings, or intermediate modules (not represented in the drawings). Intermediate modules differ from end modules 2b, 2c in that they are provided, at one of their extremities, with means for forming the flexible coupling, such as with a friction wheel 17 or a toothed wheel for example. In that case, either a further intermediate module or an end module 2b, 2c may be connected to the intermediate module already connected to the central module 2a. Instead of end modules 2b, 2c, intermediate modules may be used at the end of a table 1 according to the present invention, in which case the flexible coupling, such as the friction wheel 17 of the intermediate module used as an end module, has no real use anymore. This makes the system really versatile: as many modules as needed may be connected to each other in an easy way so as to obtain a long table 1: Intermediate modules, i.e. modules comprising means for realising the flexible coupling, are necessary in between two neighbouring or adjacent modules.

A covering lid 50 is provided for closing off the extremities of the central unit 3a, 3b, 3c. The conveyor belts 6b, 7b, 6c, 7c stick out uncovered at the extremities of the modules. Alternatively, a cover 51 (see FIG. 5) may be provided for covering the extremities of the conveyor belts 6b, 7b, 6c, 7c, which cover 51 may slide over the extremities of the conveyor belts 6b, 7b, 6c, 7c and may serve as a waiting area.

An end wall 20 may be provided with cut-outs or other openings at that side of a module 2a, 2b, 2c intended to be contacted with another module, either to allow the flexible coupling of a module to stick through the wall 20 of that module, or to allow the flexible coupling of a first module 2a to enter a second module 2c so as to engage the drive of that module 2c. This can be seen in FIG. 4.

Instead of a movable table 1 with 3 modules as described above with regard to FIG. 1, according to the first embodiment, a movable table with another number of modules, such as 5 modules (not represented in the drawings), can for example be provided. In that case, a central module 2a is provided, which has a transferring surface such as a conveyor belt driven by a drive motor 9. At each extremity of the central module 2a, an intermediate module may be provided; and at the free extremities of the intermediate modules, an end module 2b, 2c may be provided. The conveyor belts of the intermediate modules are driven by the movement of the conveyor belt of the central module 2a by means of a flexible coupling such as a friction wheel 17. The movement of the conveyor belts of the intermediate modules in turn drives the conveyor belts 6b, 7b, 6c, 7c of the end modules 2b, 2c, again by means of a flexible coupling such as a friction wheel 17.

This way, all conveyor belts 6a, 6b, 6c at one side (for example seen in front view) of the table 1 have a synchronised movement. Furthermore, modules 2b, 2c are automatically engaged when they are connected in operating position to a previous module 2a. A hinging connection 22 may be provided between two neighbouring modules 2a, 2b; 2a, 2c respectively, in which two modules are connected to each other e.g. by putting a pin in an eye on the interconnecting extremities of both modules. No chains need to be put in place in order to drive a further module 2b, 2c from a previous module 2a. The driving interconnection is made automatically when the modules are put in working position.

As the conveyor belts 6a, 6b; 6a, 6c; 7a, 7b; 7a, 7c in each module are separate from each other, a valley will be formed at the interconnection location of two modules, the depth of which is depending on the radius of the rolls or cylinders 10, 14, 18, 19 driving or guiding the conveyor belts 6a, 6b, 6c, 7a, 7b, 7c. In order to prevent food to move or roll around on a plate 5, or sauce or other liquids to spread over the plate 5, a plate supporting roll 23 may be provided, so as to level the working surface at the interconnection location between two neighbouring modules 2a, 2b; 2a, 2c. This plate supporting roll 23 supports a plate 5 in its movement from one conveyor belt to another, in order to keep the plate 5 as horizontal as possible.

Figure 5:
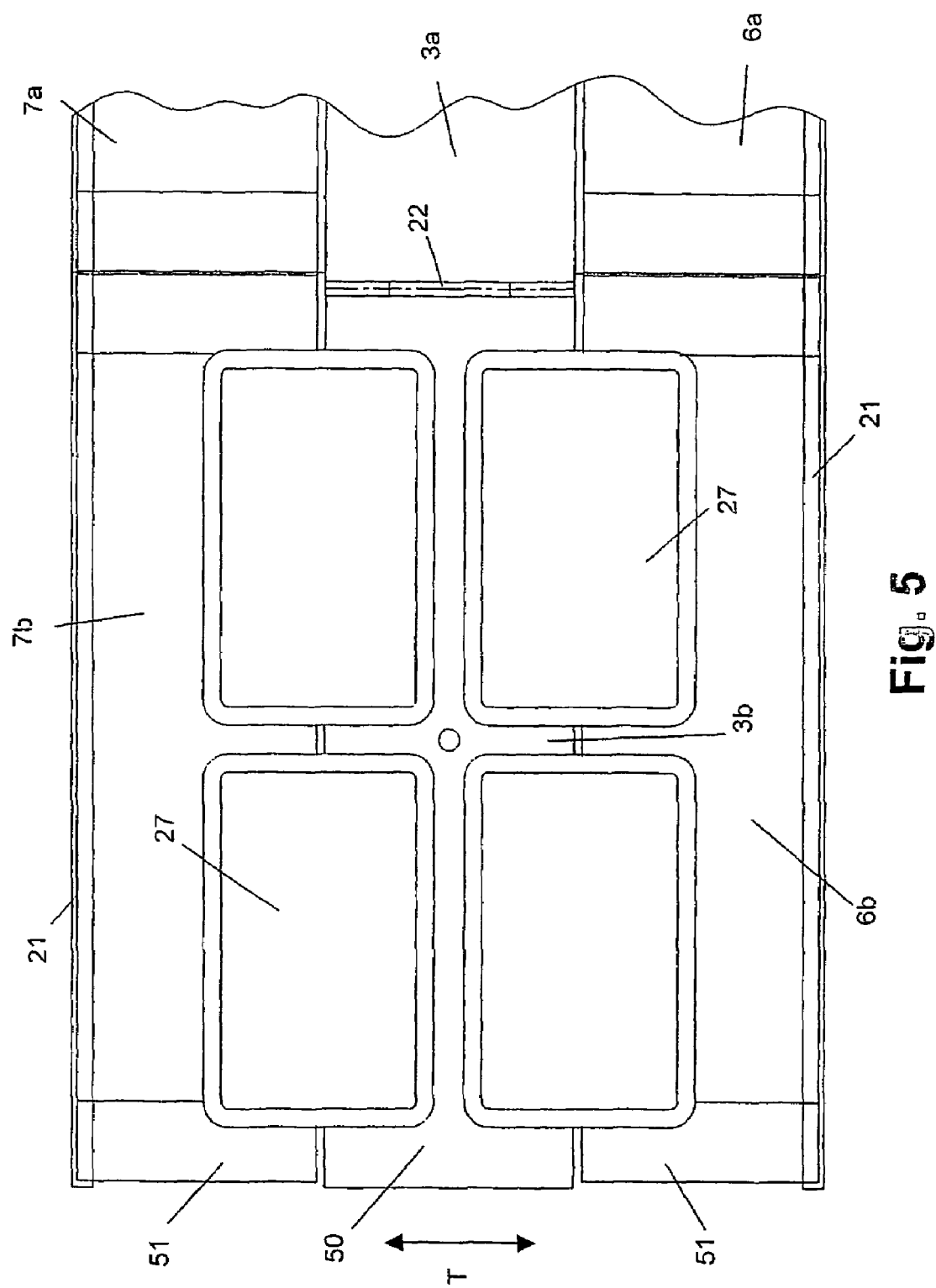
FIG. 5 is a partial top view of another embodiment of a table as in FIG. 1, comprising a wider central unit onto which a support for two dishes next to each other in the width direction of the table can be fixed.

Preferably, the central unit 3a, 3b, 3c does not extend more than 5 cm, preferably not more than 2 cm above the working surface. The top wall 24 or a side wall 25 of this central unit 3a, 3b, 3c can be provided with a means for fixing a device above the table surface, i.e. above the working surface. A device can for example be a support 26 which can be used to put dishes 27 with food ingredients upon. The means for fixing a device above the table surface may be holes in the central unit 3a, 3b, 3c into which e.g. a support 26 can be connected e.g. by clicking it in. Alternatively, the means for fixing a device above the table surface may be a telescopic tube onto which a device, e.g. a support 26, can be removably attached with any suitable means. Such telescopic tube may be driven so as to slide in and out the central unit 3a, 3b, 3c when needed. According to still an alternative embodiment, brackets may be provided, for example fixed on the side wall 25 of the central unit 3a, 3b, 3c, into which a device, such as supporting means 26 for supporting dishes 27, can be clipped. These brackets are preferably made from supple plastic materials or from stainless steel. They can for example be fixed on the side wall 25 of the central unit 3a, 3b, 3c by welding or by screwing. The dishes 27 may contain the ingredients for the meal to be served out. Having dishes 27 close to the conveyor belts 6a, 6b, 6c, 7a, 7b, 7c and above them has the advantage that the ingredients to be used are readily available and easily served out. If the supports 26 are not fixed too high above the central unit 3a, 3b, 3c, the ingredients can be taken from the dishes 27 and put on a passing plate 5 with a small movement of the hand. The top surface 24 of the central unit 3a, 3b, 3c may be relatively small, while, however, big dishes 27 can be placed onto it, because it is no problem if the dishes 27 extend over the edge of the central unit 3a, 3b, 3c and over the conveyor belts 6a, 7a, 6b, 7b, 6c, 7c, without hindering the movement of the plates 5 on the conveyor belts 6a, 7a, 6b, 7b, 6c, 7c. FIG. 2 shows a top view of an embodiment of a table 1 as represented in FIG. 1, in which only one dish 27 is provided in transversal direction T between two conveyor belts 6b, 7b. FIG. 5 shows a partial top view of an embodiment of a table 1 as represented in FIG. 1 in which two dishes 27 are provided in transversal direction T between two conveyor belts 6b, 7b. In the embodiment of FIG. 5, the central units 3a, 3b, 3c may have, but do not need to have, a larger width in transversal direction than the central units 3a, 3b, 3c in the embodiment of FIG. 2.

Another device which can be fixed above the table surface may be a heating unit 28. One or a plurality of the modules 2a, 2b, 2c of the table 1 may be provided with a heating unit 28 which, when switched on, keeps the dishes 27 and the food therein as well as the plates 5 and the food placed thereon hot, which plates are put on a corresponding conveyor belt 6a, 6b, 6c, 7a, 7b, 7c. The heating unit 28 may for example comprise infra-red (IR) heating devices. The purpose of the heating devices is not necessarily to warm up plates 5 and the food thereon, but to prevent that they cool down.

Another device which can be fixed above the table surface may be a cooling device. One or a plurality of the modules 2a, 2b, 2c of the table 1 may be provided with a cooling unit which, when switched on, keeps the dishes 27 and the food therein as well as the plates 5 and the food placed thereon cold, which plates are put on a corresponding conveyor belt 6a, 6b, 6c, 7a, 7b, 7c.

Figure 6:
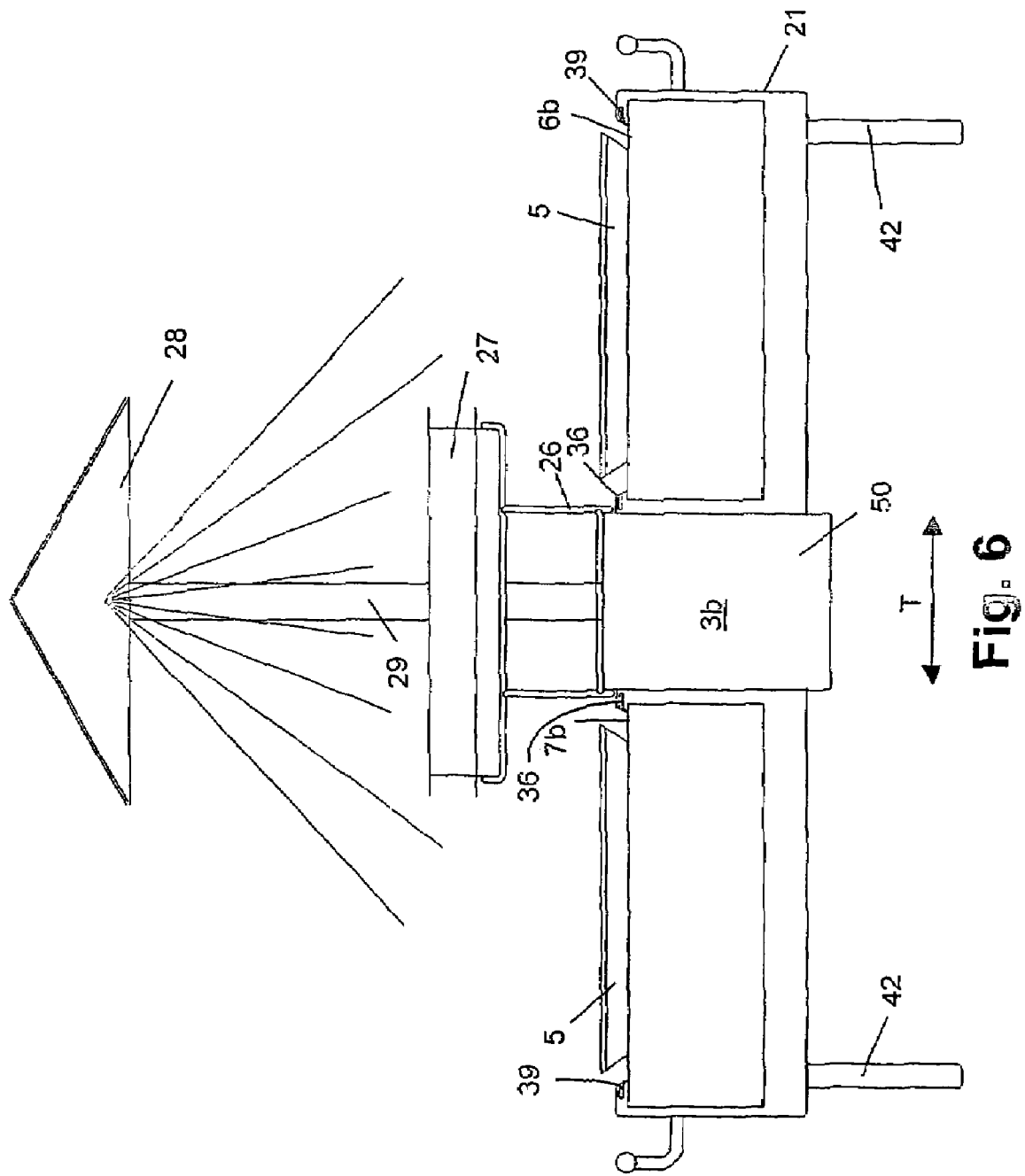
FIG. 6 is a side view of a table as in FIG. 2, provided with heating means.

The heating unit 28 or cooling unit may be provided in the middle of the transversal width of table 1, as illustrated in FIG. 2, so as to keep food on plates 5 and dishes 27 warm or cold at either side of the central units 3a, 3b, 3c, or it may be provided just on one side, if a separate hot and a cold section are provided. The mounting of a heating unit 28 at the centre of the transversal width of table 1 is illustrated in the side view of FIG. 6. A heating unit 28 is supported by a supporting pillar 29, from which the heating unit 28 can be detached. The supporting pillars 29 may for example be telescopic tubes which can disappear into the central unit 3a, 3b, 3c when they are not in use. Alternatively, the supporting pillars 29 may be detachable pillars provided with temporarily fastening means for temporarily connecting them onto the central units 3a, 3b, 3c. The temporarily fastening means may for example comprise a click system for clicking the pillars 29 in or onto corresponding parts in or on the central units 3a, 3b, 3c. According to still another embodiment, the supporting pillars 29 may be foldable. Generally a heating unit 28 will comprise three or four heating devices, each of which can be switched on or off individually, depending on the need of it being used. Temperature can be controlled by means of a potentiometer on a control panel 41.

A further removable supporting pillar 30 may be provided onto which sauce dispensers 31 may hang, as well as possibly other accessories. These supporting pillars 30 may also be telescopic tubes which may disappear completely into the central unit 3a, 3b, 3c when they are not in use. Alternatively, the supporting pillars 30 may be detachable pillars provided with temporarily fastening means for temporarily connecting them on the central units 3a, 3b, 3c. The temporarily fastening means may for example comprise a click system for clicking the pillars 30 in or onto corresponding parts in or on the central units 3a, 3b, 3c. According to still another embodiment, the supporting pillars 30 may be foldable.

In the above embodiments, above the working surface, detachable illumination devices (not represented in the drawings) may be provided, which illuminate the working surface itself. Again, these detachable illumination devices may be provided on supporting pillars, which may be telescopic tubes onto which the illumination devices can be fixed, and which telescopic tubes can completely disappear into the central unit 3a, 3b, 3c, 3d.

Figure 7:
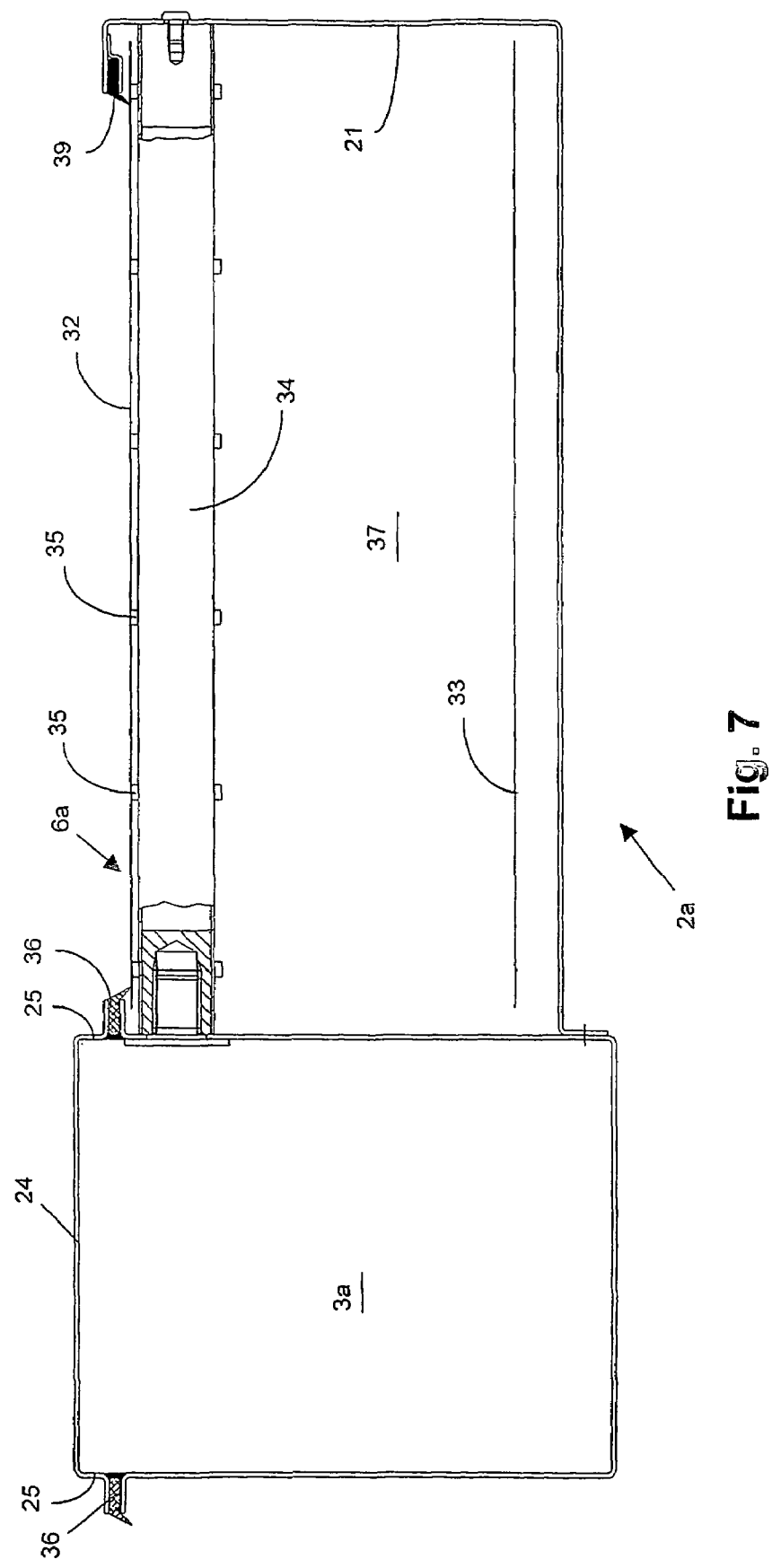
FIG. 7 is a vertical cross-section of a conveyor belt section of a module.

A vertical cross-section of a part of the table 1 can be seen in FIG. 7. A part of a cross-section of e.g. a central unit 3a of a module 2a is provided, and a cross-section of one of the conveyor belts 6a. However, FIG. 7 is illustrative for a cross-section of any module of the table 1 of the present invention. Therefore, where there is referred, in the description relating to FIG. 7, to devices having a reference number followed by a letter "a", this could equally well refer to a same device having a same reference number but followed by a letter "b" or "c".

Conveyor belt 6a rotates around two cylinders 10, 14, one of which is driving the conveyor belt 6a, so that the conveyor belt 6a, has an upper part 32, which is the part of the conveyor belt 6a used for transferring plates 5 or food. The conveyor belt 6a also has a lower part 33, which is the part of the conveyor belt 6a moving back in the opposite direction as the movement of the plates 5 or food.

Figure 8:
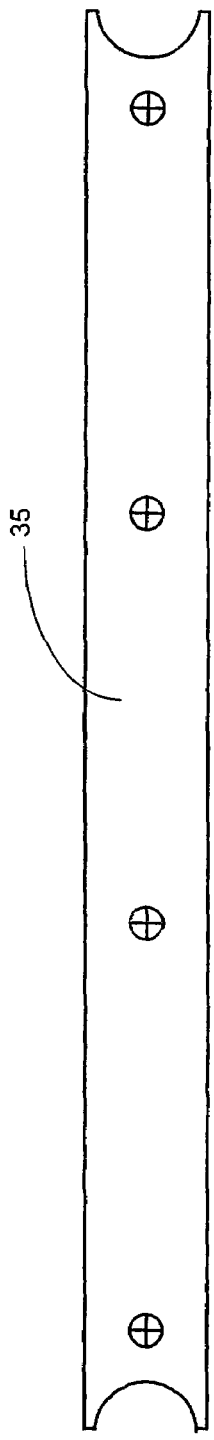
FIG. 8 is an illustration of the racks used for supporting the conveyor belts.

The upper part 32 of the conveyor belt 6a is supported by a set of side beams 34, for example fixed at regular intervals at the central unit 3a, below the upper part 32 of the conveyor belt 6a and extending over the transversal width thereof. On these side-beams 34, racks 35 are mounted, so as to form a grid-like structure. Preferably these racks 35 are made out of plastics material and/or stainless steel, and they help in supporting the conveyor belt 6a. They are illustrated in FIG. 8. A rack 35 is fixed e.g. by clicking between every two neighbouring side beams 34, or by sliding it over a side beam 34. These racks 35 can be easily demounted, also by clicking or sliding, and can then be washed, for example in a dishwasher in order to clean them. The side beams 34 are preferably cylindrical in cross-section. A seal 36, for example a silicon seal, is provided between the conveyor belt 6a and the central unit 3a in order to prevent food and liquid to fall into the conveyor belt section 37.

According to an embodiment of the present invention, as shown in FIG. 1, the lower part 33 of the conveyor belt 6a may be supported by a conveyor belt support roll 16.

At the front side of a module 2a, 2b, 2c, and thus at the front side of a conveyor belt 6a, 6b, 6c, 7a, 7b, 7c a cover panel or front panel 21 is provided (this cover panel 21 is taken away or made transparent in FIG. 1). This cover panel 21 preferably is C-shaped or inverse C-shaped in vertical cross-section, this C-shape or inverse C-shape having a back, an upper leg and a lower leg, with the lower leg of the C-shape extending up to the central unit 3a, 3b, 3c where it is connected, as can be seen in FIG. 7. A further sealing 39, for example a silicon seal, is also provided between the conveyor belt 6a and this cover panel 21, which sealing 39 also prevents food and/or liquids to enter the conveyor belt section 37.

Figure 9A:
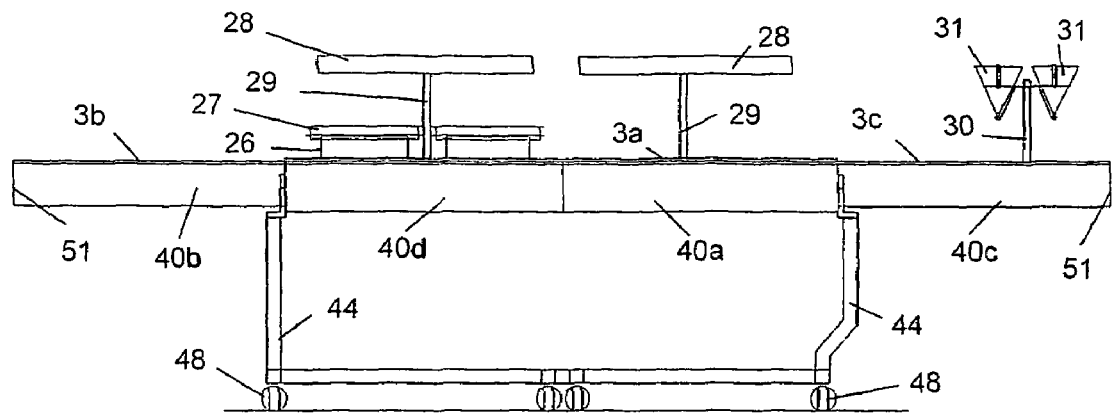
FIG. 9A is a front view of a second embodiment of a movable table for serving out food according to the present invention, the table comprising four modules and the table being in operation condition.

FIG. 9A shows a front view of a second embodiment of a table 1 for serving out food according to the present invention, this table 1 comprising four modules 40a, 40b, 40c, 40d which in operating condition are fixed to each other. The parts inside each of the modules are as the parts inside the modules 2a, 2b, 2c of the first embodiment as described above; only the way of folding modules with respect to each other for transport is different in both embodiments.

A first module 40a of the modules corresponds to the central module 2a in the first embodiment and the transferring surface thereof is directly driven by means of a drive motor 9 as described with respect to the first embodiment. A second module 40*d* corresponds to an intermediate module as described with respect to the first embodiment of the present invention, while the modules 40*b* and 40*c* correspond to end modules as described with respect to the first embodiment.

Further details about components of the table 1 of the second embodiment can readily be recognised from the drawings and are not explained here in further detail. They are as in the first embodiment. Like elements have like reference numbers.

In both embodiments, power supply cables (not represented) to the drive unit (drive motor 9) are provided, as well as power supply cables e.g. for the heating unit 28. The heating unit 28 is attached onto supporting pillars 29, as represented in FIG. 1 and FIG. 9A. The power supply cables for the heating unit 28 run through the central unit 3*b* and mount towards the heating unit 28 through the supporting pillars 29. Power supply cables to the illumination devices also run through the central unit 3*a*, 3*b*, 3*c*, 3*d* and mount towards the illumination devices through the supporting pillars.

Figure 14:
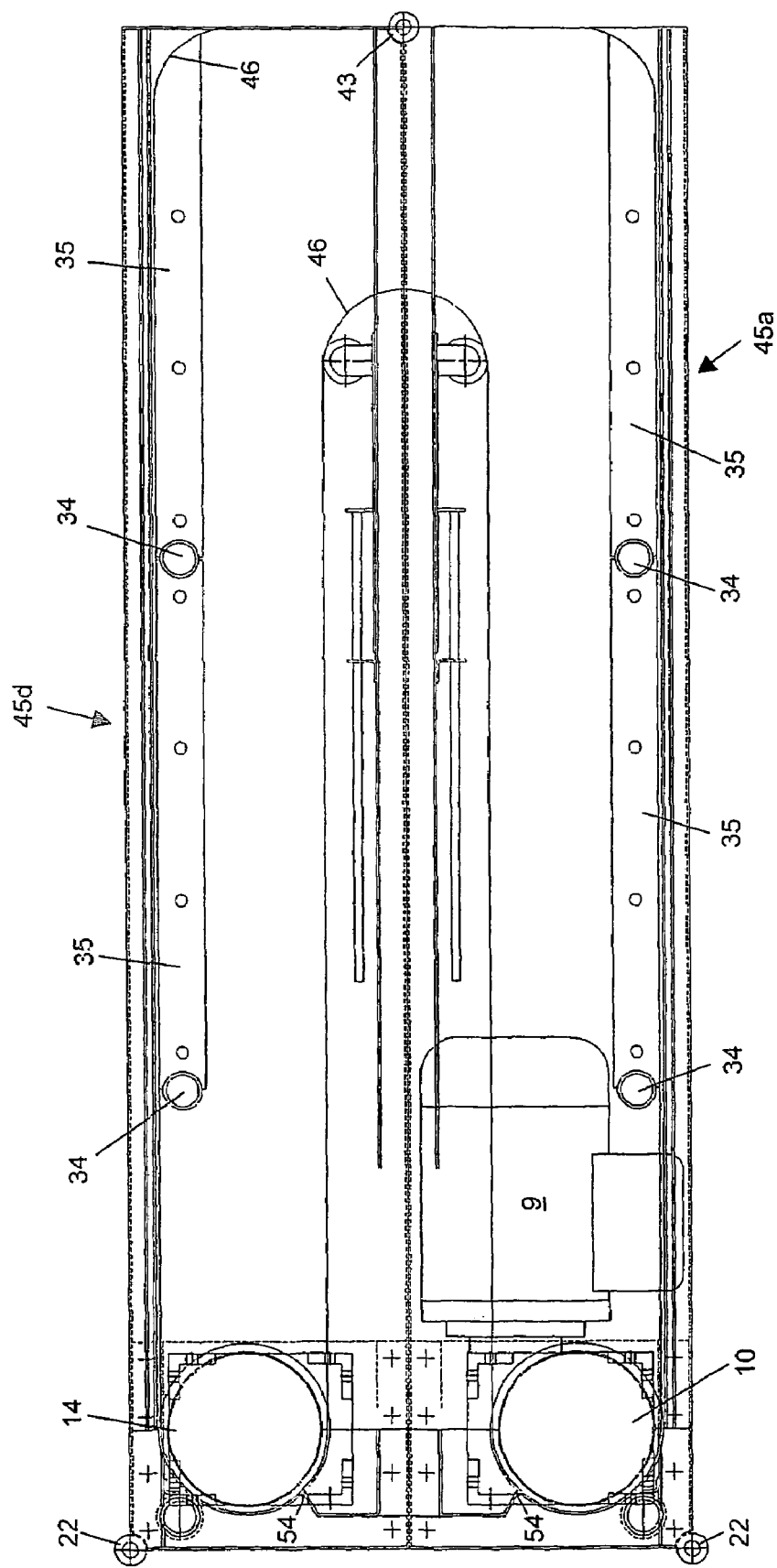
FIG. 14 is a longitudinal cross-section of a central module of a table in a folded position according to a further embodiment of the present invention, the central module comprising two foldable parts but only one conveyor belt.
Figure 16:
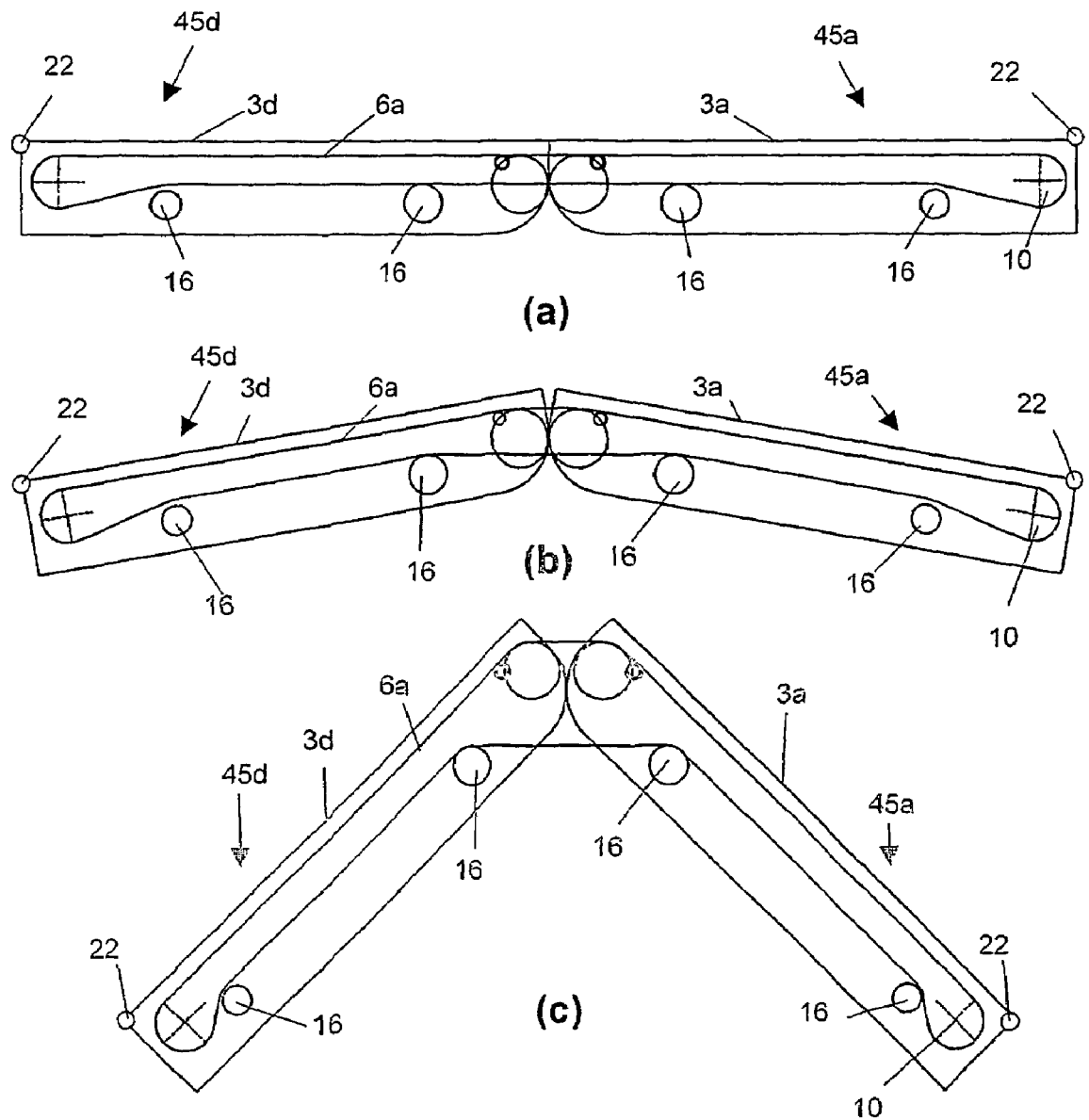
FIG. 16 is a longitudinal cross-sectional view of a central and intermediate module according to another embodiment of the present invention in three different positions; 1 view of a completely unfolded table and 2 views of a partially folded table.

According to a third embodiment of the present invention, a four-module implementation of a table 1 for serving out food may be provided, comprising a central module 45*a*, an intermediate module 45*d* connected at one extremity of the central module 45*a*, and two end modules 45*b*, 45*c*, one end module 45*b* connected to a free extremity of the intermediate module 45*d* and one end module 45*c* connected to a free extremity of the central module 45*a*. Contrary to the previous embodiments, the central module and the intermediate module are not individual modules, as they share a transferring device, such as a conveyor belt 46. If two conveyor belts are provided, one at each side of the table 1 in transversal direction, then the central module 45*a* and the intermediate module 45*d* share two conveyor belts. Therefore, the central module 45*a* and the intermediate module 45*d* cannot be physically disconnected from each other. However, both modules 45*a*, 45*d* can be folded with respect to each other, as shown in FIGS. 14 and 16. The components of the central module 45*a* and the intermediate module 45*d* are as the ones of the central module 40*a* and intermediate module 40*d* of FIGS. 9A-9C, except for the flexible coupling between the central module 45*a* and the intermediate module 45*d*, which flexible coupling automatically locates itself to be operatively linked when the table 1 is brought in operation condition. Such flexible coupling between the central module 45*a* and the intermediate module 45*d* is not necessary, as both modules 45*a*, 45*d* share the same conveyor belt or conveyor belts 46. The conveyor belt 46 is driven by means of a drive roll 10 driven by a motor 9 as in the previous embodiments, and thus not further explained here again. In the embodiments shown in FIGS. 14 and 16, no end modules 45*b*, 45*c* are represented. Such end modules 45*b*, 45*c* may be connected to the hinging connections 22 as explained above with regard to the first embodiment of the present invention. In the embodiment represented in FIGS. 14 and 16, end modules 45*b*, 45*c* to be connected to the intermediate module 45*d* or to the central module 45*a* need to be provided with means for realising the flexible coupling which automatically locates itself to be operatively linked with the drive of the central module 45*a* or with the drive of the intermediate module 45*d*, for example with a friction wheel 17. Alternatively (not represented in FIG. 14) such means, e.g. such friction wheel 17, may be provided at appropriate locations on the central module 45*a* and on the intermediate module 45*d*.

It is an advantage of a table 1 according to this third embodiment that a lot of components may be left out, such as two drive rolls for the conveyor belt 46, as well as a flexible coupling between the central module 45*a* and the intermediate module 45*d*, which flexible coupling automatically locates itself to be operatively linked with the drive of the central module 45*a*.

A table according to the above embodiment may also be provided with means (not represented in FIG. 14) for fixing a device above the table surface, the details whereof are the same as the ones given with regard to previous embodiments. Furthermore, a table according to this embodiment is also provided with power supply cables (not represented in FIG. 14).

A table according to the embodiment represented in FIG. 16 differs from the other embodiments above in that more than one conveyor belt support rolls 16 are provided to support the conveyor belt 6*a*. These support rolls 16 not only support the conveyor belt 6*a* in the unfolded position of the table 1 (part a of FIG. 16), but also support the conveyor belt 6*a* in the folded position of the table (not represented in FIG. 16) and in any intermediate position during folding of the table 1 (represented in parts b and c of FIG. 16). In order to obtain this, the support rolls 16 are provided on support roll movement means (not represented in the drawings) which enable the support rolls 16 to slightly move sidewardly, i.e. in the longitudinal direction L, during folding of the table 1.

Figure 17:
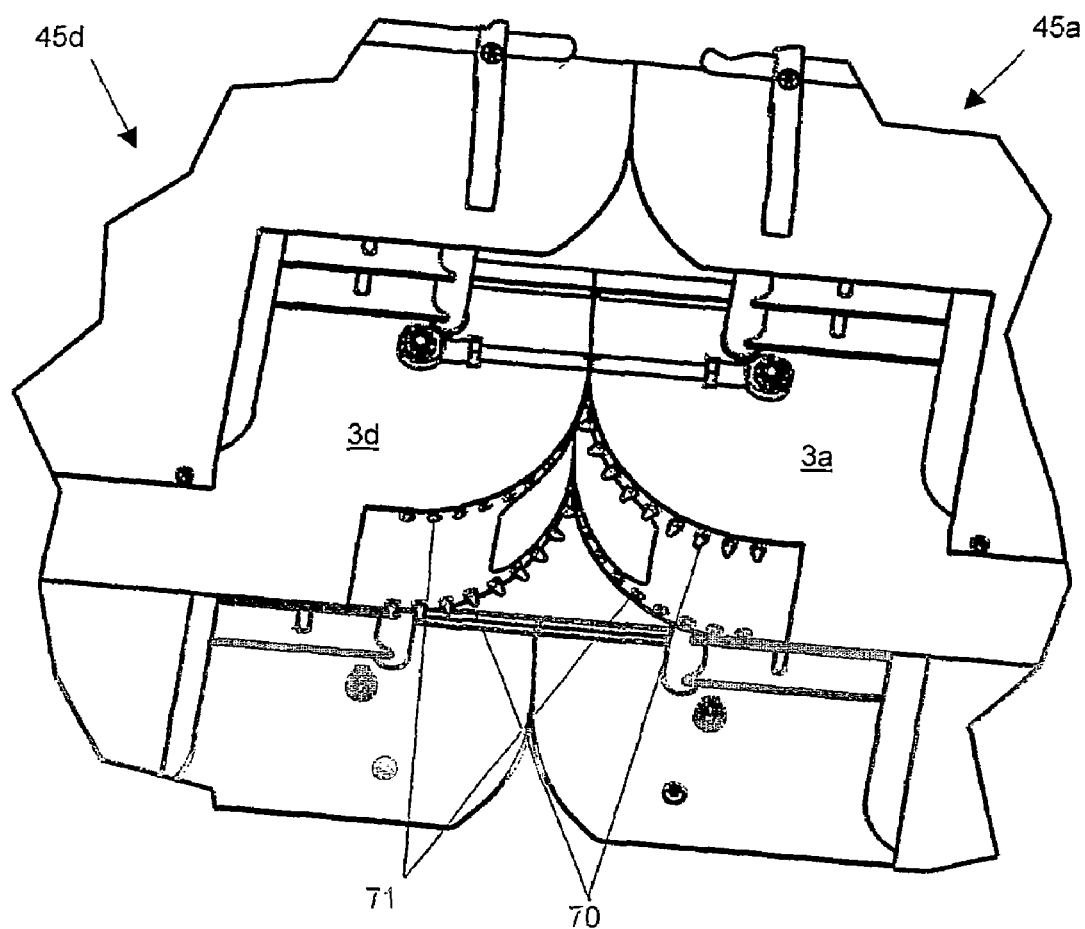
FIG. 17 is a partially cut away perspective bottom view of the interconnection between the central module and the intermediate module of the embodiment represented in FIG. 16.

Furthermore, it can be seen that the central unit 3*a* of the central module and the central unit 3*d* of the intermediate module have a rounded shape at that side where they have to hinge or have to be folded with respect to each other. Instead of the hinge 43 as in FIG. 14, toothed hinging means are used, as represented in more detail in FIG. 17. These toothed hinging means comprise teeth 70 on one of the central units 3*a*, and corresponding holes 71 on the other central unit 3*d*. when folding or unfolding the table 1 the teeth 70 and the corresponding holes 71 mesh, this way providing a hinging connection. Preferably, as represented in FIG. 17, both teeth 70 and holes 71 are provided on both central units 3*a*, 3*d*, corresponding holes 71 and teeth 70 being provided at suitable location on the other of the central units 3*d*, 3*a* respectively.

In all the embodiments, a stationary control panel 41 may be provided which comprises a plurality of switches, such as knobs or handles, for controlling a plurality of actions. The stationary control panel 41 is mounted on the table 1. According to another embodiment, instead of a stationary control panel, a remote control (not represented in the drawings), for example using IR beams, may be provided. Such remote control may for example be carried in one's pocket, or it may be removably attached onto the table 1, e.g. by a magnet. Hereunder, control switches will be described as if such stationary control panel 41 were provided.

A first set of switches is provided for left or right movement of the conveyor belts 6*a*, 7*a*, 46. This first set of switches sends appropriate signals to a control unit controlling the drive mechanism or drive motor 9 of the conveyor belts 6*a*, 7*a*, 46. According to one embodiment, both conveyor belts 6*a*, 7*a* may be driven by the same drive mechanism or drive motor 9, i.e. at the same time and at the same speed. According to another embodiment, both conveyor belts 6*a*, 7*a* may be driven separately, i.e. they may be driven independently, with different speeds. The first set of switches also comprises switches, e.g. potentiometers, for setting the speed of each of the conveyor belts 6a, 7a, 46. The conveyor belts 6a, 7a, 46 may be driven continuously or intermittently. By driving the conveyor belts 6a, 7a, 46, and by the flexible coupling as described above, also the other conveyor belts 6b, 6c, 7b, 7c of the working surface are driven.

A second set of switches may be provided for switching on or off the illumination for illuminating the workspace or working surface.

A third set of switches is provided for switching the heating devices of the heating unit 28 on or off, and for setting the temperature of each of the heating devices. Switches may also be provided for switching the cooling devices of the cooling unit on or off, and for setting the temperature of each of the cooling devices.

An emergency brake may be provided, e.g. for stopping the movement of the conveyor belts 6a, 7a, 46 and consequently also of the other conveyor belts 6b, 6c, 7b, 7c in case for example the second waiting area gets too full, in order to prevent plates 5 from falling on the floor. This emergency brake may be operated by an operator, or it may be operated automatically. In this latter case, a detector for detecting the status of e.g. the second waiting area is provided, for example an optical detector, and sends a corresponding status signal to a control unit. This control unit sends a break signal to the drive motor 9 of the conveyor belt if needed.

The use of the table 1 according to the present invention is in short explained hereinafter.

Figure 10:
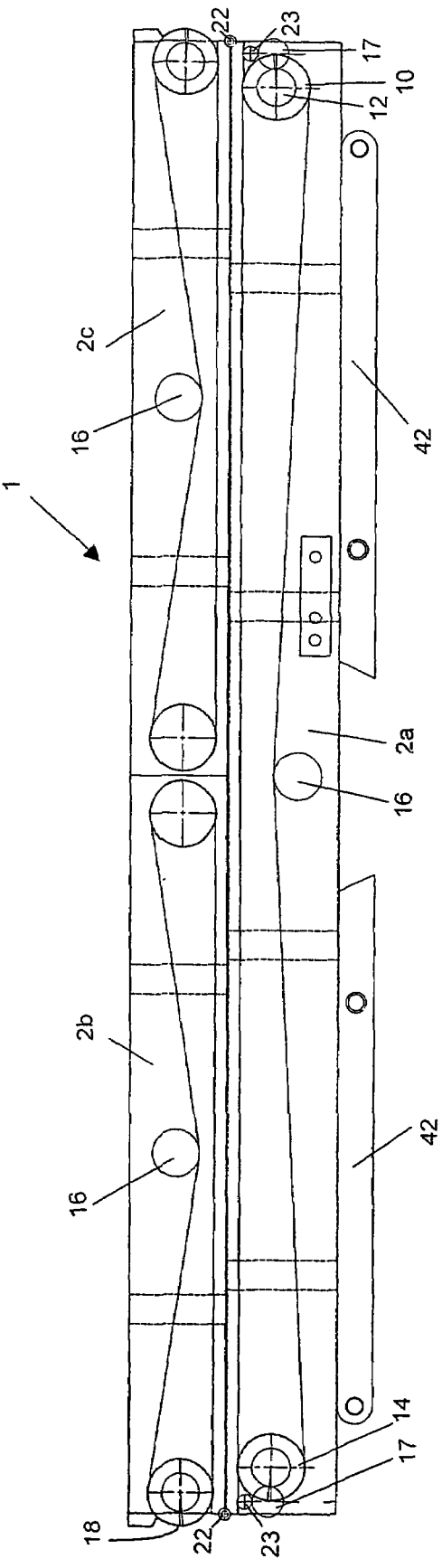
FIG. 10 is a front view of a table as in FIG. 1 comprising three modules, made partially transparent, which table is folded so as to be in a transportation position.

When a table 1 for serving out food according to the first embodiment of the present invention has to be used, it is unfolded. In first instance, it is in a folded position, as shown in FIG. 10. Either the legs 42 or a supporting frame, for example a stretcher-type of frame, are unfolded and put on the ground, or the legs 42 or supporting frame are taken off, and the central module 2a of the folded table 1 is put on a supporting surface, such as another table for example. Thereafter, the first and second end modules 2b, 2c are unfolded, i.e. they are brought in a substantially horizontal position, next to and in a direct line with the central module 2a. The result is shown in FIG. 1. By doing this, the flexible couplings between conveyor belts 6a, 7a in the central module 2a and conveyor belts 6b, 7b, 6c, 7c in the end modules 2b, 2c automatically engage under the weight of the end modules 2b, 2c. If needed or desired, further modules (not represented in the drawings) may be attached to the end modules 2b, 2c (the end modules 2b, 2c must then have the form of an intermediate module as described above), or superfluous modules 2b, 2c may be taken off. At least one device is fixed above the table surface, for example by drawing out off any of the central units 3a, 3b, 3c and/or by clicking in into any of the central units 3a, 3b, 3c means for fixing the at least one device. The device may be a support 26 onto which dishes 27 may be placed, a sauce dispenser 31, a heating unit 28, a cooling unit, an illumination device, or any other suitable device. The means for fixing the device may for example be removable pillars which are removably attached to the central unit 3a, 3b, 3c for example by clicking, or pillars of a telescopic type which can be drawn out from the central unit 3a, 3b, 3c.

Figure 11:
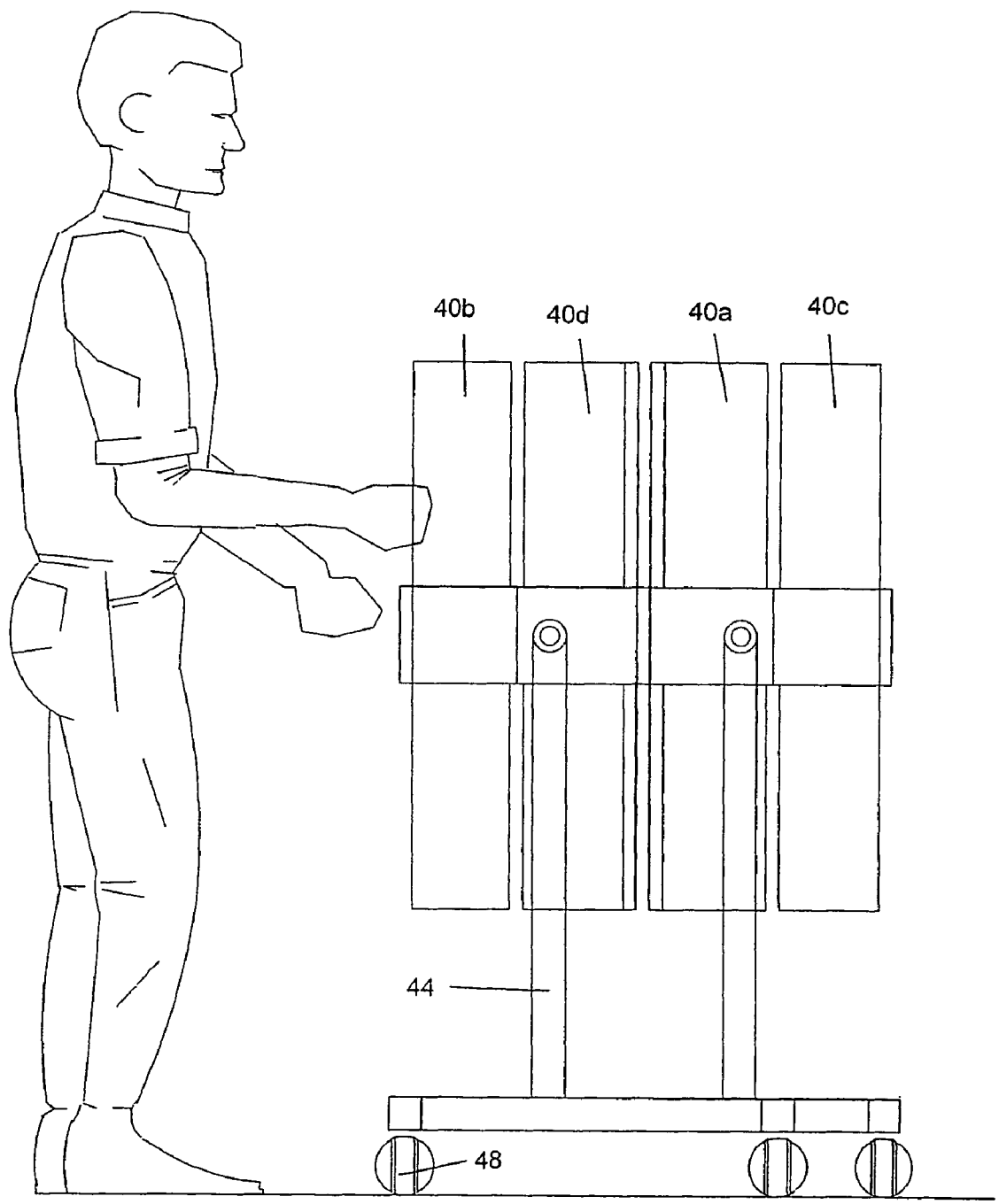
FIG. 11 is a front view of a table as in FIG. 9A comprising four modules, which table is brought in a transportation position.

When a table 1 for serving out food according to the second embodiment of the present invention has to be used, it is unfolded. In first instance the table 1 is in a folded position, as shown in side view in FIG. 11, or in top view in FIG. 12. Two halves of the table 1 are hinged around a first hinge 43 (FIG. 12) so as to bring them in line with each other, as shown in top view in FIG. 13A. The modules 40a, 40b, 40c, 40d of the table 1 now still are in a vertical position, as shown more clearly in the side view of FIG. 9C. The modules 40a, 40b, 40c, 40d are then turned over 90°, so as to be in a horizontal position, as shown in a transparent top view in FIG. 13B, or in the side view of FIG. 9B. As can be seen from FIG. 9B, two modules 40b, 40d are on top of each other. Also modules 40c and 40a are on top of each other. The upper modules 40b, 40c are then folded open, so as to bring them in a substantially horizontal position next to and in line with the modules 40a, 40d. By doing this, the flexible couplings between conveyor belts 6a, 7a in the central module 40a and conveyor belts 6b, 7b, 6c, 7c, 6d, 7d in the other modules automatically engage. Here again, further modules (not represented in the drawings) may be attached to the modules already present, if the modules already present have the form of an intermediate module as described above, or superfluous modules may be taken off. At least one device is fixed above the table surface, for example by drawing out off any of the central units 3a, 3b, 3c and/or by clicking in into any of the central units 3a, 3b, 3c means for fixing the at least one device. Supports and devices can be as explained above with regard to the first embodiment.

When a table 1 for serving out food according to the third embodiment of the present invention has to be used, it is unfolded. In first instance the table 1 is in a folded position, as shown partially in cross-sectional side view in longitudinal direction L in FIG. 14, or in a cross-sectional side view in transversal direction T in FIG. 12. The unfolding will be done substantially as in the second embodiment, the only difference being that there is no automatic engaged coupling between the central module 45a and the intermediate module 45d when the table is brought in operation condition, as both modules share the same conveyor belt.

To serve out a large number of plates, in both the first and the second embodiments, the conveyor belts 6a, 7a are started, driven by the drive motor 9, and one after one, plates 5 are e.g. put at the conveyor belt 6b, 7b at the upstream side of the conveyor belts 6a, 7a. During transportation of the plates 5, people standing next to the table 1 serve out food. The completely served out plates 5 are taken away at the conveyor belts 6c, 7c at the downstream side of the conveyor belts 6a, 7a.

In case the table 1 for serving out food does not need to be used or needs to be transported, it is folded by carrying out handlings which are the inverse of the handlings as described above for putting the table 1 in a working position. In case of the first embodiment of the table 1, as in FIG. 1, the folding of the table 1 may be done by detaching modules up to a situation where there is one central module 2a and two end modules 2b, 2c or two intermediate modules attached thereto or one end module and one intermediate module attached thereto. All devices put above the working surface, such as e.g. supports 26, heating units 28, detachable illumination devices, sauce dispensers 31 and so on are taken off, and the supporting pillars 29, 30 for each of these devices are removed as well. This may either be done by removing the pillars 29, 30 by clicking them out off the central unit 3a, 3b, 3c for example, by folding them back or by pushing them into the central units 3a, 3b, 3c if they consist for example of telescopic tubes. A hinging connection 22 is made between the central module 2a and each of the intermediate or end modules 2b, 2c connected thereto, and the connected modules 2b, 2c can be folded so as to lay on top of the central module 2a. This way, the working surfaces, more particularly the conveyor belts 6a, 6b, 6c, 7a, 7b, 7c are protected from external influences such as dirt and damaging. The legs 42 or frame of the table 1 can be folded as well. The table 1 can be turned over 90° so as to be in an upright position, and can be stored in a safe place in a safe position. Alternatively, the table 1 can be transported to another location. Due to the folding, the table 1 can be carried through doors, narrow corridors and in elevators. The folded table 1 is robust in transport. The separate, detached modules, if any, can be carried as such. This makes the folded table 1 lighter to carry. Alternatively, further hinging connections (not represented in the drawings) can be provided so as to enable to fold further modules (not represented in the drawings) over the central module 2a with two intermediate modules folded thereupon. This way, a harmonic folding is obtained. The folded table 1 may be provided with transportation means, such as wheels for example, for making transport of the table 1 easier. Different kinds of transportation means may be provided, depending on the wishes of the user.

Figure 9B:
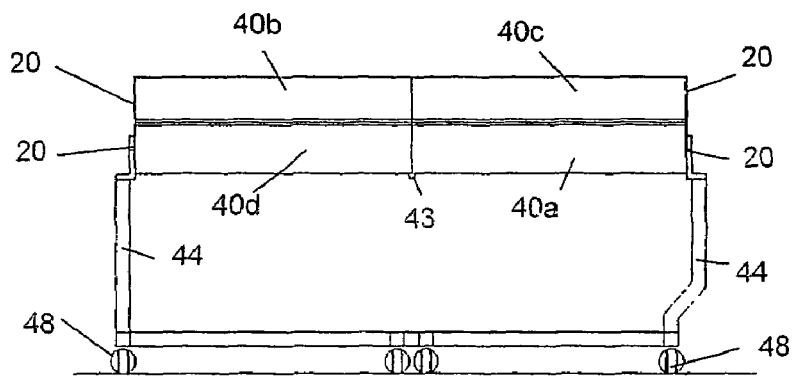
FIG. 9B and FIG. 9C are intermediate positions of the table 1 of FIG. 9A when being folded or unfolded, i.e. when being moved from operation condition to transportation condition or vice versa.
Figure 9C:
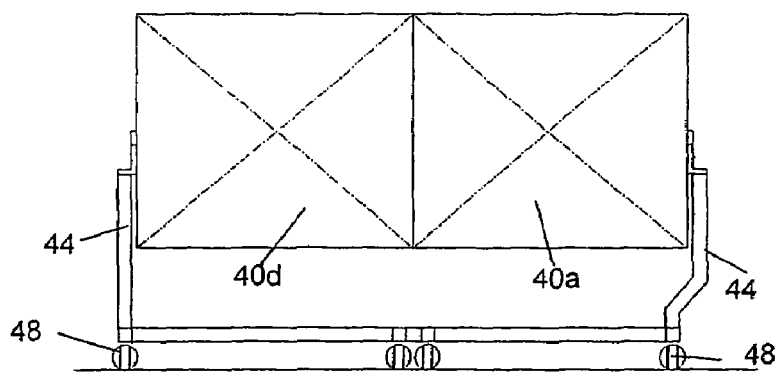
Figure 12:
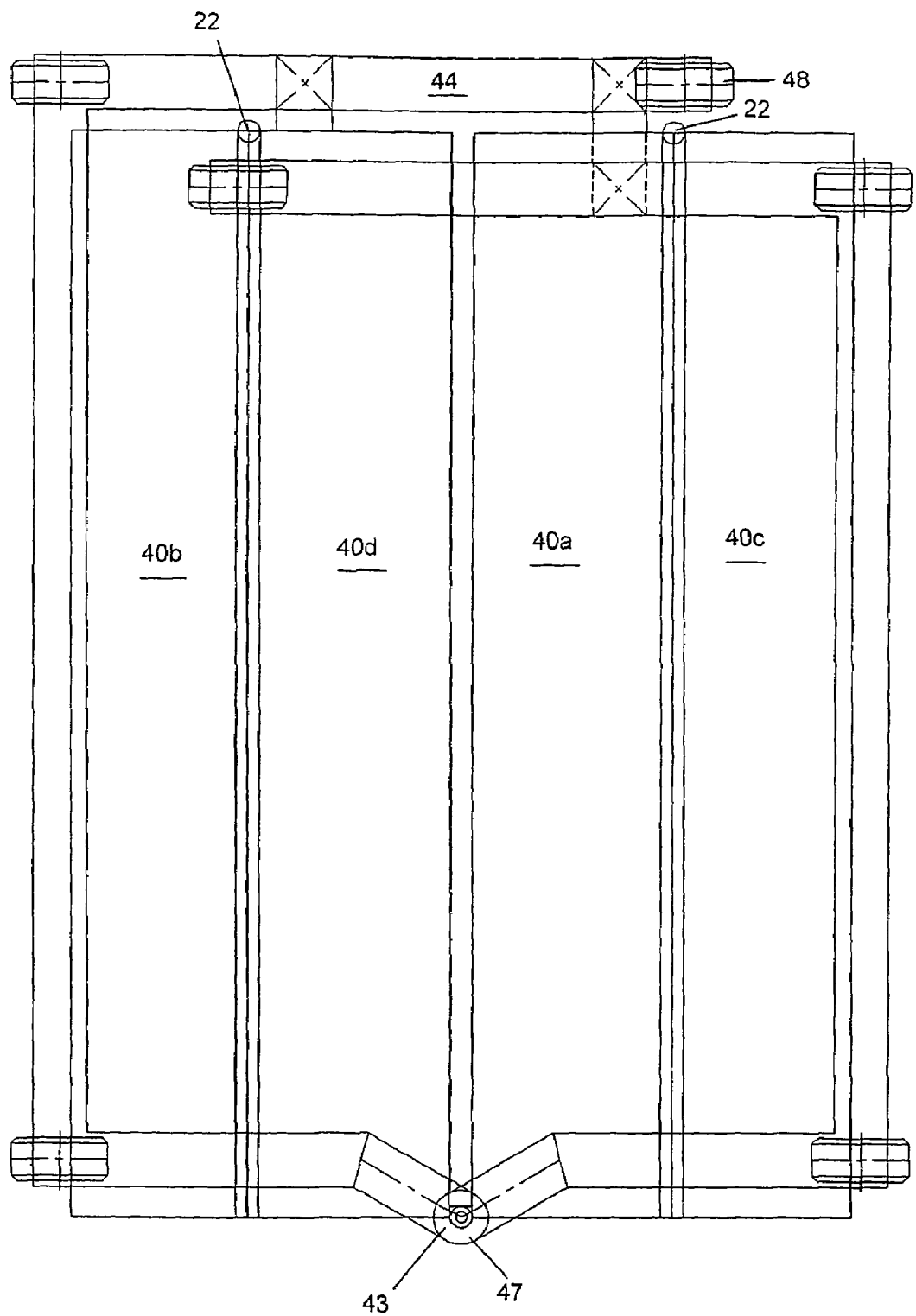
FIG. 12 is a top view of the folded table of FIG. 11.
Figure 13A:
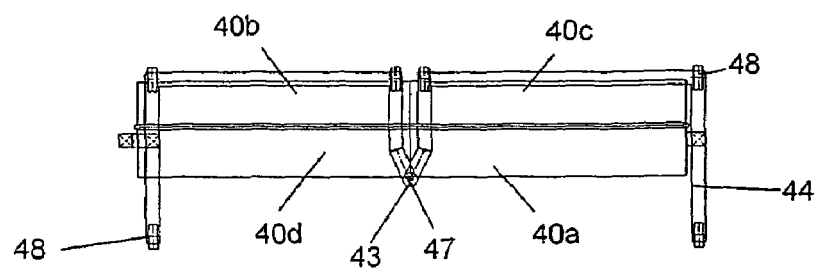
FIG. 13A, FIG. 13B and FIG. 13C are top views of the table of FIG. 9C, FIG. 9B and FIG. 9A respectively.
Figure 13B:
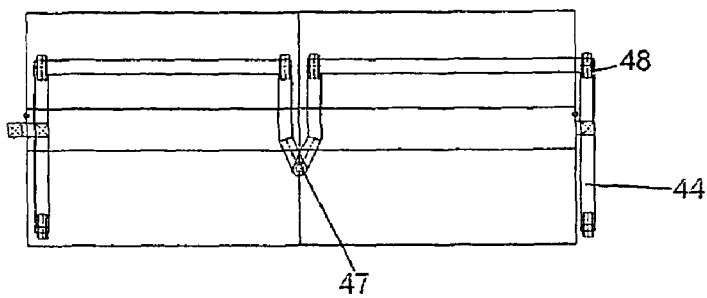
Figure 13C:
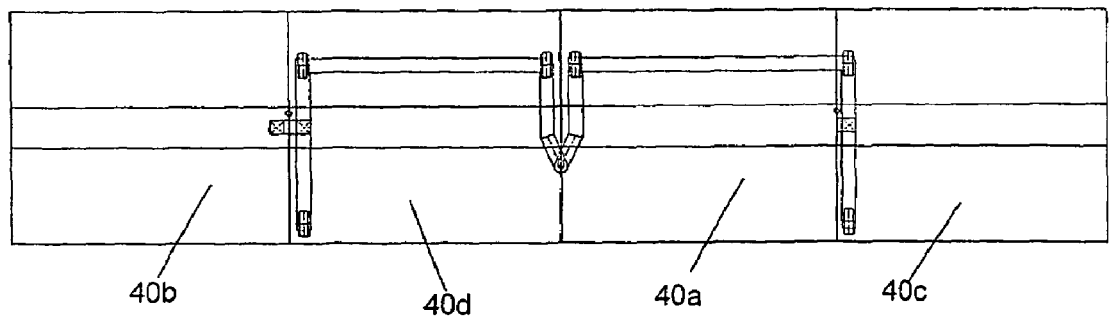

In case of a table 1 according to the second embodiment of the present invention, as shown in front view in FIG. 9A and in top view in FIG. 13C, the folding of the table 1 may be done by detaching modules up to a situation where there is one central module 40a, an intermediate module 40d and two end modules 40b, 40c or two intermediate modules attached thereto. All devices put above the working surface, such as e.g. supports 26, heating units 28, cooling units, detachable illumination devices, sauce dispensers 31 and so on are taken off, and the supporting pillars 29, 30 for each of these devices are removed as well. This may either be done by removing the pillars 29, 30 by clicking them out off the central unit 3a, 3b, 3c, 3d for example, by folding them back or by pushing them into the central units 3a, 3b, 3c, 3d if they consist for example of telescopic tubes. The two end modules 40c, 40b or intermediate modules are then folded over the central module 40a and the intermediate module 40d respectively. A front view of this situation is shown in FIG. 9B, and a top view thereof is shown in FIG. 13B. By doing this, the coupling of the drive between the intermediate module 40d and the end module 40b, and the coupling of the drive between the central module 40a and the end module 40b automatically disengages. Thereafter, the modules 40a, 40b, 40c, 40d are turned over 90° so as to be in a vertical position, as shown in front view in FIG. 9C and in top view in FIG. 13A. The table 1 is carried by a frame 44 on wheels 45, which frame 44 itself can hinge at a hinging connection 47 substantially in the middle, there being a vertical axis through the hinging point 47 of the frame 44 and the hinging point 43 of the modules 40a and 40d. By folding together the frame 44 around its hinging point 47, also the modules of the table 1 are folded together once more, as illustrated in top view in FIG. 12 and in side view in FIG. 11. This folding automatically disengages the coupling between the intermediate module 40d and the central module 40a. In order to be able to fold the frame 44 together, it must be asymmetrical so as to prevent the wheels 48 of the frame 44 from colliding. An example of such asymmetrical frame 44 is shown in front view in FIGS. 9A-9C. Once folded, the table 1 according to the second embodiment is easy to transport. Here again, the working surfaces of the modules 40a, 40b, 40c, 40d are protected from dirt and damaging.

Figure 15:
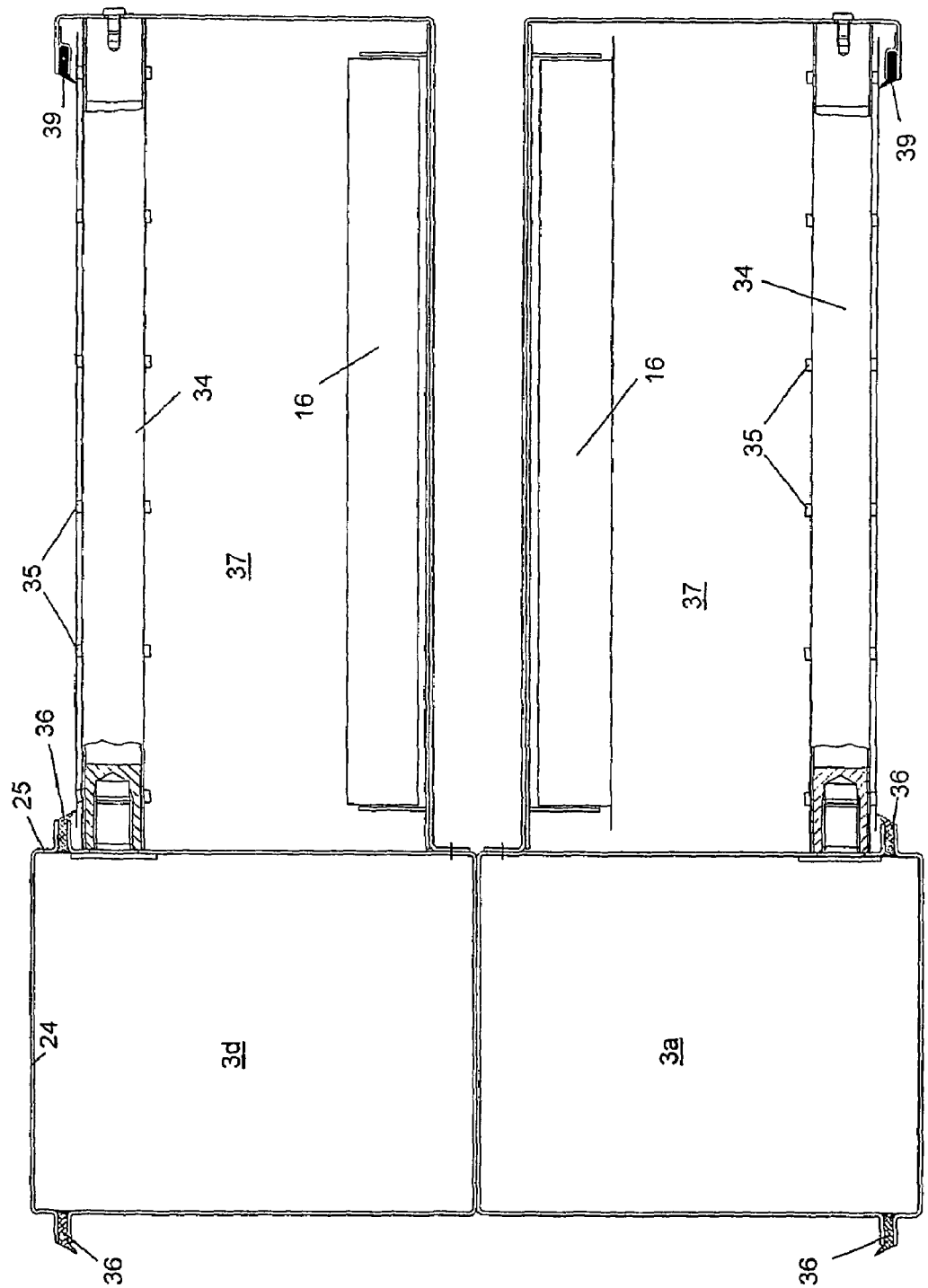
FIG. 15 is a cross-sectional view perpendicular to the view of FIG. 14.

In case of a table 1 according to the third embodiment of the present invention, as illustrated in FIG. 14 and in FIG. 15, the folding of the table 1 may be done by detaching modules up to a situation where there is one central module 45a, an intermediate module 45d and two end modules 45b, 45c or two further intermediate modules attached thereto. All devices put above the working surface, such as e.g. supports 26, heating units 28, cooling units, detachable illumination devices, sauce dispensers 31 and so on are taken off, and the supporting pillars 29, 30 for each of these devices are removed as well. This may either be done by removing the pillars 29, 30 by clicking them out off the central unit 3a, 3b, 3c, 3d for example, by folding them back or by pushing them into the central units 3a, 3b, 3c, 3d if they consist for example of telescopic tubes. The two end modules 45c, 45b or intermediate modules are then folded over the central module 45a and the intermediate module 45d respectively, analogue as for the second embodiment. By doing this, the coupling of the drive between the intermediate module 45d and the end module 45b, and the coupling of the drive between the central module 45a and the end module 45b automatically disengages. Thereafter, the modules 45a, 45b, 45c, 45d are turned over 90° so as to be in a vertical position, also as illustrated with regard to the second embodiment in FIG. 9C and in FIG. 13A. The table 1 may again be carried by a frame on wheels (not represented in the drawings), which frame itself can hinge at a hinging connection substantially in the middle, there being a vertical axis through the hinging point of the frame and the hinging point 43 of the modules 45a and 45d. By folding together the frame around its hinging point, also the modules of the table 1 are folded together once more, and the result looks as the result of the folded table according to the second embodiments as illustrated in FIG. 12 and in FIG. 11. This folding bends the conveyor belt 46 shared by the central module 45a and the intermediate module 45d. In order to be able to fold the frame together, it must be asymmetrical so as to prevent the wheels of the frame from colliding. An example of such asymmetrical frame is shown in front view in FIGS. 9A-9C. Once folded, the table 1 according to the third embodiment is easy to transport. Here again, the working surfaces of the modules 45a, 45b, 45c, 45d are protected from dirt and damaging.

Preferably, for all embodiments, the components of the table 1 are made, as far as possible, from lightweight materials.

Cleaning of the table 1 for serving out food according to any of the embodiments of the present invention is facilitated. All parts can be easily taken apart. The front plates or cover panels 21 of a module may be made lose and taken away. Tension is taken away on the conveyor belt 6a, 7a, 6b, 7b, 6c, 7c, 46 in any suitable way, and the belt 6a, 7a, 6b, 7b, 6c, 7c, 46 is taken off. All this can be done by a single person. The racks 35 are taken out by clicking or by sliding them over the side beams 34. The side beams 34 are taken out, as well as the cylinders 10, 14, 18, 19 and every single piece is cleaned. All parts can be easily cleaned with soap, for example in an (industrial) dishwasher. They can furthermore be disinfected by any suitable means.

Thorough cleaning of the table 1 after use may be done as follows. A cleaning cassette (not represented in the drawings) is slid over the free extremity of a conveyor belt. This cleaning cassette is provided with a liquid supply such as water or soap or disinfecting solution supply and a corresponding discharge means for evacuating used liquid. A brush or other cleaning means is provided for actively cleaning the surface of the conveyor belts. The conveyor belts are driven to obtain this.

Cleaning of the conveyor belts during use can be done by providing mechanical surface cleaning means such as a turning brush and/or a scraping device (not represented in the drawings) which touch the turning conveyor belt and so remove food parts sticking on the belt surface.

The turning of the brush may be driven by the turning of the conveyor belt itself. The brush may be a dry brush.

Alternatively, the brush may be provided with an inlet of cleansing fluid, in which case the conveyor belt is cleaned by cleansing fluid being brushed over the belt surface. In this case, an exit for dirty cleansing fluid must be provided.

The scraping device may comprise a scraper mounted on a cylindrical pipe, onto which also a mass is mounted. The scraper preferably has a wedge-shaped tip for scraping parts from the surface of the conveyor belt. The cylindrical pipe fits over a protruding part on the central unit, and can rotate thereabout. The scraper is always pushed against the surface of the conveyor belt due to gravitational forces on the mass, which pull the scraper in the good direction. Also the scraping device can easily be taken off the protruding part, and can be washed e.g. in a dishwasher. A scraping device may be provided both at the drive roll of the conveyor belts and at the second cylinder of the conveyor belts. This means that a plurality of scraping devices may be provided in the table 1.

Alternatively, a scraping device 52 may be formed by the housing of the belt itself, as represented in FIG. 3A and in FIG. 14. By operatively connecting an end module or an intermediate module to an extremity of another module of the table, a V-shaped receptacle 53 may be formed. The top part 54 of the wall of the V-shaped receptacle 53 touches the conveyor belt and thus scrapes off food and dirt from the conveyor belt, which scraped off food and dust are collected in the V-shaped receptacle 53. When folding the table 1, the V-shaped receptacle 53 can easily be reached for cleaning.

The conveyor belts may also be cleaned and disinfected by radiation disinfecting means, such as optical surface cleaning means, such as a UV cleaner, i.e. cleaning with ultraviolet (UV) light. The surface of the conveyor belts is irradiated with UV light generated by a UV light source (not represented in the drawings). UV light decomposes organic molecules. UV disinfection can be done while using the table, as well as after having used the table.

It is an advantage of the table according to the present invention that it does not contain dead spaces which cannot easily be reached, and in which insects, bacteria or other microbes could multiply or from which old and contaminated or rotten food could fall down into the kitchen.

It is to be understood that although preferred embodiments, specific constructions and configurations, as well as materials, have been discussed herein for devices according to the present invention, various changes or modifications in form and detail may be made without departing from the scope and spirit of this invention.

The invention claimed is:

1. A movable table for serving out food, comprising at least two modules, the table having an operating position for serving out food, and a transportation position for transporting the table, the at least two modules comprising an automated transferring device for transferring food receptacles from one end of the table to an opposite end thereof, the upper side of the transferring device in operating position forming a working surface of the table, each of the at least two modules being provided with a transferring mechanism for transferring food receptacles on the automated transferring device of that module when the table is in the operating position, wherein the transferring mechanism of a module is connectable to the transferring mechanism of a neighbouring module by means of a coupling which automatically locates itself to be operatively linked with the transferring mechanism of the neighbouring module as the table is brought into the operating position and operatively disengaged when the table is brought into the transportation position.

2. A movable table according to claim 1, the table furthermore being provided with means for fixing a support above the table surface.

3. A movable table according to claim 1, wherein the table furthermore comprises a device for bringing the transferring mechanism of a module into operating condition with the transferring mechanism of a neighbouring module.

4. A movable table according to claim 3, wherein the device for bringing the transferring mechanism of a module into operating condition with the transferring mechanism of a neighbouring module is an automatic coupling device.

5. A movable table according to claim 3, wherein the device for bringing the transferring mechanism of a module into operating condition with the transferring mechanism of a neighbouring module is a manually operated coupling device.

6. A movable table according to claim 1, wherein the table comprises a single motor unit for all modules.

7. A movable table according to claim 2, wherein the means for fixing a support is made integral with the table.

8. A movable table according to claim 2, wherein the means for fixing a support is telescopic with respect to the working surface of the table.

9. A movable table according to claim 1, wherein the modules are foldable with respect to each other.

10. A movable table according to claim 1, wherein a module can be disconnected.

11. A movable table according to claim 1, furthermore comprising a set of collapsible legs for positioning the table.

12. A movable table according to claim 1, furthermore comprising cleaning means for cleaning the working surface of the table.

13. A movable table according to claim 1, furthermore comprising disinfecting means for disinfecting the working surface.

14. A movable table according to claim 1, furthermore comprising a heating unit and/or a cooling unit for heating and/or cooling at least part of the working surface.

* * * * *

UNITED STATES PATENT AND TRADEMARK OFFICE
CERTIFICATE OF CORRECTION

PATENT NO. : 7,337,895 B2 Page 1 of 1
APPLICATION NO. : 10/552600
DATED : March 4, 2008
INVENTOR(S) : Marc De Maeyer It is certified that error appears in the above-identified patent and that said Letters Patent is hereby corrected as shown below:

Column 1, Line 65, replace "whit" with --with--.

Column 6, Line 66, replace "an" with --a--.

Column 7,
  Line 16, replace "Therefor" with --Therefore--.
  Line 41, replace "realising" with --realizing--.

Column 11,
  Line 9, replace "recognised" with --recognized--.
  Line 63, replace "realising" with --realizing--.

Column 13, Line 30, replace "In first instance" with --In the first instance--.

Signed and Sealed this

First Day of July, 2008

JON W. DUDAS
*Director of the United States Patent and Trademark Office*